(12) United States Patent
Ryan et al.

(10) Patent No.: US 7,431,884 B2
(45) Date of Patent: Oct. 7, 2008

(54) CHEMICAL ASSAYS

(75) Inventors: Paul Thomas Ryan, Cambridgeshire (GB); Kevin Andrew Auton, Cambridgeshire (GB); Sergei M Schurov, Cambridgeshire (GB); David John Wigley, Cambridgeshire (GB)

(73) Assignee: PerkinElmer LAS, Inc., Boston, MA (US)

( * ) Notice: Subject to any disclaimer, the term of this patent is extended or adjusted under 35 U.S.C. 154(b) by 548 days.

(21) Appl. No.: 10/258,551

(22) PCT Filed: Nov. 22, 2001

(86) PCT No.: PCT/GB01/05158

§ 371 (c)(1),
(2), (4) Date: Oct. 25, 2002

(87) PCT Pub. No.: WO02/41994

PCT Pub. Date: May 30, 2002

(65) Prior Publication Data

US 2003/0096423 A1    May 22, 2003

(51) Int. Cl.
*G01N 33/48* (2006.01)
(52) U.S. Cl. .................. 422/68.1; 422/103; 422/102
(58) Field of Classification Search ............. 422/68.1, 422/103, 100, 102
See application file for complete search history.

(56) References Cited

U.S. PATENT DOCUMENTS

| 3,982,438 | A | | 9/1976 | Byrd |
| 4,858,883 | A | * | 8/1989 | Webster ............ 251/61.1 |
| 5,088,515 | A | * | 2/1992 | Kamen ............ 137/15.17 |
| 5,863,502 | A | | 1/1999 | Southgate et al. |
| 6,043,080 | A | * | 3/2000 | Lipshutz et al. ...... 435/287.2 |
| 6,075,367 | A | | 6/2000 | Brugger |
| 6,149,787 | A | | 11/2000 | Sundberg et al. |
| 6,168,948 | B1 | * | 1/2001 | Anderson et al. ...... 435/287.2 |

* cited by examiner

*Primary Examiner*—Yelena Gakh
*Assistant Examiner*—Natalia Levkovich
(74) *Attorney, Agent, or Firm*—St. Onge Steward Johnston & Reens LLC

(57) ABSTRACT

An assay device in which to carry out a fluid-phase chemical assay, comprising means for supporting a test substrate, a sample chamber for receiving a fluid sample and at least one fluid control device for controlling the movement of fluid into and/or out of the sample chamber, wherein the fluid control device comprises a fluid outlet chamber in fluid communication with the sample chamber, and a displaceable flexible diaphragm the displacement of which alters the volume of the outlet chamber so as to allow and/or restrict fluid flow between the outlet and sample chambers. The invention also provides assay apparatus incorporating such a device, an assay station for use as part of such apparatus, a fluid control unit for use as part of the assay device and a method of conducting an assay which may involve the use of such apparatus and devices.

24 Claims, 16 Drawing Sheets

CHEMICAL ASSAYS

This application is the US national phase of international application PCT/GB 01/05158 filed 22 Nov. 2001, which designated the US.

FIELD OF THE INVENTION

This invention relates to methods, apparatus and devices for use in carrying out chemical (which includes biochemical) assays, in particular for the detection of biological materials such as proteins and peptides.

BACKGROUND TO THE INVENTION

Certain types of chemical, in particular biochemical, assays involve immobilising on a test substrate a probe species capable of binding selectively to a target species. A fluid sample, containing or suspected to contain the target species, is brought into contact with the test substrate; target species present in the sample will then bind to the immobilised probe. After washing the substrate to remove unbound species, the presence of the target-probe pair can be detected in several known ways, including via chemical "labels" (for instance, labels capable of chemiluminescence or fluorescence) attached to the target species.

This principle is used in a large number of biochemical assays, for instance to detect the presence of target nucleotide sequences or proteins. It involves, however, an often complex sequence of procedures. A suitably selective probe for the target species must firstly be identified, usually by means of some form of screening, and immobilised on a test substrate. A sample fluid must then be maintained in contact with the substrate for a sufficient period of time, and under suitable conditions, for target-probe binding to take place (and to take place to a detectable degree). During this period, the temperature of the sample often needs to be cycled between quite precise ranges and over specific time periods, to enable binding to occur. The test substrate must then be washed, usually with increasing levels of stringency to remove not only unbound species but also those which are bound with an unacceptably low degree of specificity. Finally, the washed substrate must be analysed to detect the presence and/or amount of target-probe pairs.

These procedures can to an extent be automated, but often still involve significant manual intervention, for instance to control the introduction of samples and reagents at appropriate times and locations. Moreover, apparatus for carrying out the procedures can be both complex and costly, involving large numbers of separate fluid control devices (valves and pumps) in order to introduce what is often a large number of necessary sample and/or reagent fluids.

Since it may be desirable to assay a large number of samples at a time, and/or to test a sample against a large number of probe species, there is a constant need to enhance the efficiency of such assays, to reduce the complexity of the apparatus in which they are carried out, to minimise the amount of manual intervention needed, to maximise throughput and/or to increase accuracy and consistency in the results. Furthermore, since the samples being assayed are often scarce (for instance, DNA-containing samples), and typically need to be screened for more than one target species, it is always desirable to minimise the amount of sample needed for an assay, typically by increasing detection sensitivity.

It is already known to carry out a chemical assay by spreading a thin layer of a liquid sample over a flat test substrate, such as a glass microscope slide, on which an "array" of several, often hundreds or more, probe species has been immobilised. This allows the sample to be screened simultaneously for a corresponding number of target species. Such arrays have, for instance, been disclosed recently for the detection of proteins in a biological sample; the test substrate may be referred to as a "protein array" or "protein biochip" [de Wildt, R M T et al, *Nat Biotechnol,* 18 (9), 989-94 (September 2000); Mendoza, G, *BioTechniques,* 27 (4), 781-788 (1999); Bussow, K et al, *Genomic* 65, 1-8 (2000)]. It would be desirable to be able to use such substrates in an at least partly automated assay process, and preferably to be able to process a plurality of substrates simultaneously.

STATEMENTS OF THE INVENTION

According to a first aspect of the present invention there is provided an assay device in which to carry out a fluid-phase chemical assay, the device comprising (i) means for supporting a test substrate, (ii) a sample chamber for retaining a fluid sample in contact with a test substrate which is so supported and (iii) at least one fluid control device for controlling the movement of fluid into and/or out of the sample chamber, wherein the fluid control device comprises a fluid outlet chamber in fluid communication with the sample chamber, and a displaceable flexible diaphragm the displacement of which alters the volume of the fluid outlet chamber so as to cause and/or allow and/or restrict fluid flow between the fluid outlet chamber and the sample chamber.

The term "fluid-phase chemical assay" means a diagnostic test for detecting the presence and/or quantity of a target species in a fluid sample, by means of a chemical reaction. It is intended to embrace biochemical assays such as for the detection of a target nucleotide sequence (DNA, RNA etc.) or protein or peptide. It will typically involve the use of a probe species immobilised on a test substrate with which the sample is brought into contact, the probe species being capable of reacting with the target species, via which reaction the presence and/or quantity of the target species may be detected. The reaction suitably involves selective binding of the probe species to the target species, the bound pair being detectable using conventional techniques such as fluorescence, chemiluminescence, coloured dyes and the like.

The means for supporting a test substrate may include means, such as clamps, spring clips and the like, for securing the substrate in place in the assay device. It preferably also includes sealing means, such as an appropriately shaped gasket or an O-ring seal, for sealing areas of contact between the test substrate and the rest of the device, in particular to help define, and to prevent fluid leakage from, the sample chamber.

The assay device may be capable of supporting two or more test substrates.

The sample chamber may be defined at least partly by a test substrate which, in use, is supported in the device. The sample chamber should then be an enclosed space, save for fluid inlets and/or outlets such as those providing fluid communication with the fluid control device(s). Preferably the sample chamber volume is small, typically between 50 and 120 µl, such as between 100 and 120 µl. More preferably it can enclose a thin layer of the sample fluid, for instance between 50 and 100 µm deep, adjacent the active surface of a test substrate supported in the device. The "active surface" of the substrate is that part of its surface which carries one or more probe species; the sample chamber ideally allows the enclosed fluid to contact the whole of the active surface. The dimensions of the active surface are typically about 20 mm by between 30 and 65 mm.

Again, the assay device may include two or more sample chambers which may, in use, be associated with separate test substrates or with different regions of a single substrate.

The fluid control device may comprise a fluid flow control valve such as for controlling the introduction of fluid to and/or evacuation of fluid from the sample chamber. It may comprise a fluid agitation device for inducing fluid movement within the sample chamber, such as by forcing fluid into and/or out of the sample chamber. It may comprise a fluid storage device in which a quantity of fluid may be held prior to its introduction into or following its evacuation from the sample chamber or another part of the assay device. (The word "comprise" is used in this specification to mean either "be" or "include".)

The fluid control device is preferably itself controllable using a control fluid, which may be supplied to a region of the flexible diaphragm such that variations in the control fluid pressure cause displacement (which term includes distortion) of the diaphragm. The fluid control device therefore preferably comprises a control chamber and a control port through which control fluid may be introduced into the control chamber, the diaphragm being arranged between the control chamber and the fluid outlet chamber in such a way that displacement of the diaphragm, caused by pressure changes in control fluid supplied to the control chamber, alters the volume of the outlet chamber. A suitable control fluid is compressed air, although many other pressurised liquids or gases could be useable to the same effect.

Instead or in addition, the fluid control device may be at least partially controlled by varying the pressure of one or more of the other fluids (eg, sample or reagent fluids) supplied to it.

The flexible diaphragm should be made from, at least at its surface, a material which is inert with respect to the reagents which will pass through the assay device in use. It must have sufficient resilience to function in the required manner under the fluid pressures likely to be applied to it, ie, to be displaceable and/or distortable between the required operating positions. Suitable diaphragm materials include silicone rubbers of hardness 40 to 60 Shore A and thickness between 0.3 and 2 mm, typically 1 mm. These may optionally be faced with low or high density polyethylene (LDPE or HDPE) or polypropylene, of a film thickness between 10 and 100 µm.

Where the fluid control device comprises a valve, it preferably additionally comprises a fluid inlet chamber, the flexible diaphragm being displaceable between a first position in which it restricts or prevents fluid communication between the fluid inlet and outlet chambers and a second position in which fluid communication between the inlet and outlet chambers is allowed.

The inlet and outlet "chambers" may take the form of fluid conduits. Communication between them may be directly or via one or more intermediate chambers and/or conduits. In general in this specification, the term "fluid communication" embraces both direct and indirect communication, though preferably direct unless otherwise specified.

Where the fluid control device comprises a fluid agitation device, again the diaphragm is preferably arranged between a control chamber and the fluid outlet chamber in such a way that displacement of the diaphragm, caused by pressure changes in control fluid supplied to the control chamber, alters the volume of the outlet chamber. In this way, displacement of the diaphragm can cause fluid to be forced either into or out of the sample chamber, thus generating fluid movement within the sample chamber. Such movement is generally desirable to maintain a homogeneous sample fluid and hence increase accuracy and sensitivity of an assay.

Preferably, the assay device of the invention incorporates two such fluid agitation devices, which can be reciprocally operated to move fluid back and forth through the sample chamber. In such an arrangement, the two agitation devices preferably communicate with opposite ends of the sample chamber, or at least with two spaced apart regions of the sample chamber.

Where the fluid control device comprises a fluid storage device, it preferably comprises a fluid inlet port for receiving fluid (typically a sample fluid) and a fluid storage chamber, in fluid communication with the inlet port, for holding fluid received at the inlet port. The diaphragm then preferably functions to control movement of fluid into and out of the storage chamber, being displaceable between a first position in which fluid is held in the storage chamber, and a second position in which fluid is urged out of the storage chamber and into the outlet chamber. Control of the diaphragm, to displace it between these first and second positions, may be effected by means of an associated valve and/or by the application of a pressure change to another part of the control device, for example directly to the storage chamber, more particularly by the supply of control fluid to the diaphragm to displace it within the storage chamber.

Communication between the storage and outlet chambers may be via an intermediate chamber. Moreover, a single port may function as both inlet and outlet, the relative fluid pressures (i) in the storage and/or intermediate chambers and (ii) at the inlet/outlet port determining the direction of fluid flow, and the diaphragm position either allowing or preventing flow as desired. This arrangement may effectively comprise a combination of a fluid storage device and a diaphragm-operated valve to control the introduction of fluid into it, for example via the intermediate chamber.

The storage chamber typically holds a small volume, for instance between 50 and 200 µl, preferably between 100 and 150 µl, of fluid. It ideally holds at least enough fluid to fill the associated sample chamber; a 90 µl sample chamber may for instance be associated with a 150 µl storage chamber, which can of course be part filled if appropriate. The storage chamber is particularly suited for the storage of small quantities of scarce sample fluids, which may be pre-loaded into the assay device and stored in close proximity to the sample chamber, for introduction into the sample chamber at an appropriate point in an assay.

Where the fluid control device has a fluid inlet port or inlet conduit, the port or conduit may be of any size and shape suitable to allow the introduction of fluid for example from a source elsewhere in the assay device or, in the case of a sample fluid, conveniently via a needle or pipette. The inlet port or conduit may for example have an opening to the exterior of the device, the opening being adapted to receive a pipette or other fluid introducing means.

The fluid control device may comprise a fluid loading device, into which fluids may be loaded and/or evacuated and/or transferred either from outside the assay device or from other component(s) within the assay device. Such a fluid loading device comprises a receptacle, such as a cup- or bowl-shaped receptacle, to accommodate fluid which may be introduced into it for instance from an external source. Preferably, the receptacle is directly accessible from the outside of the assay device, and most preferably, it is adapted to receive a fluid introducing means such as a pipette.

A cup- or bowl-shaped receptacle may conveniently be provided in the exterior surface of a plate or block forming part of the assay device, as described above. Its capacity may suitably be between 10 and 500 µl, preferably between 50 and 100 µl, depending on its intended use. It will have at least a first outlet which provides fluid communication with another part of the assay device, typically a fluid storage device or the sample chamber, such communication conveniently being via another fluid control device such as a valve.

The receptacle preferably also has a second outlet through which fluid may be evacuated, typically to waste. The locations of the first and second outlets will depend on their intended functions; suitably the second is positioned, in use, at a higher fluid level within the receptacle than the first.

Preferably at least the first outlet is in direct fluid communication with a valve for controlling fluid flow into and/or out of the fluid loading device. More preferably still, the first outlet is in direct fluid communication with, or constitutes, the fluid inlet chamber of a valve of the type described above which is operated via a displaceable flexible diaphragm.

Thus, in a fluid control device (in particular a valve) which forms part of an assay device according to the invention, any fluid inlet chamber or port preferably is or comprises a fluid loading device of the type described above.

The assay device of the invention preferably comprises more than one, typically two or more, for instance two, such fluid loading devices, which may then be used for loading fluids from externally and/or for transferring fluids between other components of the device (eg, sample chambers, fluid storage devices and reagent or other fluid sources). Each loading device may be associated with (ie, in direct or indirect fluid communication with) one or more storage devices and/or sample chambers, and/or with one or more other fluid loading devices so that fluid may be transferred between the loading devices for example via a commonly connected storage device. The capacity of each loading device (ie, of its fluid receptacle) is ideally larger than that of an associated sample chamber and/or storage device, by an amount sufficient to accommodate losses and "dead" volumes and still to provide sufficient fluid to fill the relevant chamber/device. Its capacity may for example be between 10 and 100% greater than that of the associated chamber/device.

The assay device of the invention preferably comprises more than one fluid control device of the types described above. It may for instance comprise both a fluid inlet and a fluid outlet valve, controlling respectively the introduction of fluid into and evacuation of fluid from the sample chamber. It may comprise more than one fluid inlet valve, allowing the introduction of more than one fluid into the sample chamber. Fluid inlet valves may also be provided for controlling the introduction of fluid(s) into one or more fluid storage devices. The assay device may comprise one or more fluid receiving ports associated with one or more of the inlet valves. It preferably additionally comprises one or more fluid agitation devices, preferably at least two. More preferably it additionally comprises one or more fluid storage devices, in which fluid may be held in close proximity to the sample chamber. Not all of the fluid control devices need be in direct fluid communication with the sample chamber.

Ideally the assay device comprises at least three, more preferably at least four or five or six fluid control devices, the fluid ports and chambers of which are defined within a single unit which may also serve at least partly to support a test substrate. The assay device can thus comprise integral fluid control devices, which may be supplied from externally with appropriate sample, reagent, wash and control fluids. This allows the device to be relatively simple and compact in construction. It also facilitates independent temperature control, flow rate analysis and other necessary processes for a test substrate supported within the device.

The unit in which the fluid control devices are provided may comprise, for instance, a block or plate made from a suitable material, such as a metal or plastics material, in which the necessary fluid chambers, conduits and ports may be machined, moulded or similarly provided. Chambers, conduits and ports may be provided at the face of such a block or plate and may be at least partly defined by a sealing layer, such as a gasket, positioned adjacent that face.

More preferably still, the assay device of the invention comprises a single flexible diaphragm common to more than one, ideally all, of its fluid control devices. In other words, a single diaphragm is arranged to perform more than one function at different locations in the assay device, the locations corresponding to the relevant fluid chambers in the fluid control devices. Typically a separate means for controlling the device operation will be needed at each such location; this may comprise a separate control chamber or port, for bringing a control fluid into contact with the diaphragm at the relevant location to cause a local displacement of the diaphragm. All the control ports may, in use, be supplied with control fluid from a single source, optionally with a separate valve or other means to control the supply of fluid to each control port. These features can again simplify the construction of the assay device.

The diaphragm may for example be positioned between two adjacent plates or blocks, each providing certain fluid chambers and channels to form part of the fluid control devices. In a more preferred embodiment, the assay device comprises more than two (for instance three) stacked plates, with a diaphragm positioned between each pair of adjacent plates, so that different fluid control devices can be defined by different plate pairs. This increases the versatility of the system, allowing a wider range of devices to be provided in a single unit and in a wider range of locations within that unit.

One or more of the plates may also serve as a support for a test substrate.

In regions of the device where the diaphragm contacts, and provides a seal around, the edges of a fluid conduit or chamber defined in an adjacent plate or block, raised surface elements (eg, ridges) or other forms of surface profiling may be provided adjacent or close to the perimeter of the conduit or chamber, so as to amplify, in the region of the conduit or chamber perimeter, the force applied to clamp the diaphragm in position adjacent the plate or block. Such surface profiling may be provided on the surface(s) of either or both of the plates between which the diaphragm is clamped (preferably that in which the relevant conduit or chamber is defined), and/or on the diaphragm itself.

Ideally the assay device of the invention also incorporates a fluid distribution assembly, by means of which the necessary fluid(s) may be introduced into the device from external sources and subsequently removed from the device. This assembly will typically include one or more fluid inlet ports, directly or indirectly connectable to external sources of for instance reagent and wash fluids, and one or more conduits through which fluid may pass from the inlet port(s) to the fluid control device(s) of the assay device. It will also include one or more fluid outlet ports, directly or indirectly connectable for instance to a waste reservoir, and one or more conduits through which fluid may pass from the assay device to the outlet port(s).

Again, the necessary fluid channels may be drilled, extruded, machined or moulded within a unit such as a plate or block which is appropriately positioned with respect to the fluid control device(s) of the assay device. Chambers, conduits and ports may be provided at the face of such a plate or block and may be at least partly defined by a sealing layer, such as a gasket, positioned adjacent that face. Most preferably, the fluid ports and conduits of the distribution assembly are provided in the same plate or block in which the fluid control devices, or parts thereof, are located, or at least in an adjacent plate or block.

The inlet ports of the distribution assembly may in certain cases correspond to those of the fluid control devices and may for example comprise fluid loading devices of the type described above. One or more of the inlet ports may be for the introduction of a control fluid such as compressed air.

The incorporation of such a fluid distribution assembly allows for a plurality (often a very large number) of assay devices to be connected to a common set of fluid supply and removal lines, and to the controls for such fluid lines, and hence to be simultaneously processed in a single assay apparatus.

A second aspect of the present invention provides an assay device in accordance with the first aspect, in combination with a test substrate on which one or more probe species are immobilised. The substrate may, for example, be a glass slide. The probe species may be immobilised on the substrate in any known manner. Preferably the substrate carries a plurality (for instance, up to about 100,000, typically between about 5,000 and 20,000) of immobilised probe species, in any suitable arrangement such as in an array.

According to a third aspect of the present invention, there is provided a device for monitoring the flow rate of a first fluid, typically a liquid, the device comprising a primary measuring chamber through which the first fluid may flow, a fluid inlet port upstream of the primary measuring chamber, through which a volume of a second fluid (typically a gas, such as in the form of a bubble) may be introduced into the first fluid flow, and primary detection means, associated with the primary measuring chamber, for detecting the presence of the second fluid in the first fluid as they pass through the primary measuring chamber. The detection means may be electrical in operation, detecting changes for example in conductance or capacitance between electrical contacts positioned at different locations in the flow path of the first fluid through the measuring chamber. A printed circuit board may for instance be provided in, and conveniently form one wall of, the measuring chamber, to detect the presence or absence of the second fluid in the measuring chamber—where the first fluid is a liquid and the second an injected gas bubble, for instance, absence of the liquid indicates the presence of the gas bubble, and can be detected using the printed circuit board.

Alternatively, optical detection means may be used, such as are described for instance in U.S. Pat. No. 4,210,809.

The time taken for the second fluid to reach the primary measuring chamber, from its inlet port, may thus be measured and used to provide an indication of the flow rate of the first fluid through the device.

Preferably, the monitoring device additionally comprises a secondary measuring chamber, in fluid communication with and conveniently downstream of the primary one, the secondary chamber having associated with it a secondary detection means, for detecting the presence of the second fluid in the first as they pass through the secondary measuring chamber. A more accurate indication of the first fluid flow rate may then be obtained by measuring the time taken for the second fluid to travel between the two measuring chambers. Fluid communication between the measuring chambers is preferably by means of an extended, more preferably labyrinthine, fluid conduit, to increase the distance travelled by the first and second fluids between the measuring chambers.

The flow rate monitoring device of this third aspect of the invention may be used in association with an assay device according to the first aspect, to measure the rate of flow of one or more fluids through the assay device. The monitoring device is preferably incorporated in, more preferably integral with, the assay device, conveniently downstream of the sample chamber. This can be achieved, for instance, by providing the measuring chamber(s), fluid conduit(s) and inlet port(s) of the monitoring device in a unit containing the fluid control device(s).

An assay device according to the first aspect of the invention preferably incorporates means for controlling the temperature inside the sample chamber; this may be particularly useful in the case where a biochemical assay involving thermal cycling is to be carried out in the device. The temperature control means may include conventional devices such as hot air blowers, ovens, fans, fluid heating and/or cooling baths, etc. The assay device may for instance comprise a heat sink, of conventional construction, which can be cooled for instance by means of a fan which forces a cooling fluid (such as air) through channels provided in it, and which can preferably also be heated for instance electrically. Heat may then flow by conduction between the heat sink and the rest of the device, at least in the region of the sample chamber.

Instead or in addition, the temperature control means may comprise channels within the device or its surrounding apparatus, through which a heating/cooling fluid may be caused to flow. This fluid may be externally heated and/or cooled by any convenient means, for instance electrical resistance heaters, forced (or natural) air-cooled heat exchangers or peltier devices. It may be circulated by convection or, preferably, by means of a pump. Such a form of temperature control can give improved temperature uniformity, both across the test substrate and also between assay devices where several are to be processed together. It may make possible more rapid temperature changes, in particular if several external reservoirs of heating/cooling fluids are held at different desired temperatures to be supplied to the assay device at appropriate times. In use, several assay devices may be supplied by a common source or sources of heating/cooling fluid(s).

For more efficient heating and/or cooling the assay device, or if appropriate groups of assay devices, is/are preferably enclosed in a chamber to isolate it/them from neighbouring assay devices and from the surrounding environment.

According to a fourth aspect of the present invention, there is provided apparatus for carrying out a fluid-phase chemical assay, the apparatus comprising an assay device in accordance with the first aspect of the invention, and/or an assay device/test substrate combination in accordance with the second aspect, and/or a flow rate monitoring device in accordance with the third aspect.

Such apparatus preferably comprises a plurality of assay devices in accordance with the invention. It may comprise one or more assay "stations", each of which can accommodate a plurality of assay devices. Each station ideally has an associated fluid distribution assembly, communicating with those of its assay devices, to enable appropriate fluids to be supplied to the assay devices and spent fluids to be removed to waste.

A typical such assay station might be capable of supporting for instance at least four or six or ten or twelve or sixteen assay devices. Apparatus according to the fourth aspect of the invention could include for example at least three or four or five or ten assay stations. This would allow the simultaneous execution of a large number of assays, each in a respective assay device, and would lend itself particularly well to at least partial automation, for instance under the control of a microprocessor. Ideally the fluid movement through each assay device and/or assay station could be independently controlled. Similarly, the operating temperature could be independently controlled for at least each individual assay station.

A fifth aspect of the invention provides a fluid distribution system for use in the apparatus of the fourth aspect, the system comprising first and second fluid inlet lines via which first and second fluids may be drawn from respective sources, first and second fluid flow control devices, each allowing a variable fluid flow rate, in the first and second fluid inlet lines respectively, and control means for controlling individually the flow rates through the first and second fluid flow control devices. The system preferably additionally comprises a fluid mixing device, downstream of the fluid flow control devices, for combining the first and second fluids emerging from the control devices. The combined fluid stream emerging from the fluid mixing device may then be directed to a desired location, preferably to one or more assay devices or assay stations according to the invention.

The fluid flow control devices are preferably variable rate pumps, or alternatively valves providing adjustable flow rates.

Such a fluid distribution system allows two fluids to be combined in a desired ratio. Ideally the fluid flow rates through the first and second fluid flow control devices are continuously variable between their minimum and maximum values, allowing for continuous variation of the first and second fluid ratio in the mixture emerging from the system. This could be of particular use, for instance, in supplying varying concentrations of reagent or wash solutions to an assay device (in which case the first fluid might be a suitable reagent in concentrated form and the second fluid a diluent such as water).

The fluid distribution system may include more than two fluid inlet lines with more than two respective fluid flow control devices. In this case any desired number of fluid mixing devices may be included to achieve any desired combination of the fluids passing through the system.

The fluid distribution system may form part of apparatus according to the fourth aspect of the invention, and may be used to supply one or more sample, reagent or wash fluids to the assay device(s). Preferably apparatus according to the fourth aspect includes more than one such distribution system, for introducing more than one fluid mixture into the assay device(s).

According to a sixth aspect of the present invention, there is provided a fluid control unit for use as part of an assay device according to the first aspect, the unit comprising a fluid control device as described above, ie, comprising a fluid outlet chamber which is connectable to an assay device sample chamber in use, and a displaceable flexible diaphragm the displacement of which alters the volume of the fluid outlet chamber so as to cause and/or allow and/or restrict, in use, fluid flow between the fluid outlet chamber and the sample chamber. The unit preferably comprises a plurality of such fluid control devices, which may include (as above) valve(s), fluid agitation device(s), fluid storage device(s) and/or fluid loading device(s).

The unit is preferably constructed from two or more adjacent plates having a flexible diaphragm positioned between each pair of adjacent plates, at least some of the fluid chambers and ports of the fluid control device(s) being defined in those faces of the plates which are adjacent the diaphragm(s). One of the plates may also serve as a support for a test substrate, in use. The unit preferably also comprises means (such as fluid inlet and outlet ports) for connecting it to external fluid inlet and outlet conduits (for instance, leading to fluid sources and/or to waste), to one or more supplies of a control fluid such as compressed air, and/or to a sample chamber when the unit forms part of a complete assay device.

The unit of the sixth aspect of the invention preferably additionally comprises a flow rate monitoring device in accordance with the third aspect, and/or temperature control means as described in connection with the first aspect.

A seventh aspect of the invention provides an assay station comprising means for accommodating one or more assay devices, preferably according to the first aspect of the invention, and a fluid distribution assembly (for instance as described above) which is connectable, for example via fluid ports, to external fluid conduits for the supply of fluids to, and/or their removal from, assay devices held at the station, the fluid distribution assembly having one or more fluid conduits to allow fluid communication between the assay devices and one or more external fluid conduits. More preferably, the assay station comprises one or more, preferably a plurality of, fluid control units in accordance with the sixth aspect of the invention, the fluid distribution assembly allowing communication between the external fluid conduits and each of the fluid control units. More preferably still, the assay station comprises two or more adjacent plates with a flexible diaphragm positioned between each pair of adjacent plates, wherein the fluid control devices of the individual units, and at least in part the fluid conduits of the distribution assembly, are provided within the two plates.

The devices, apparatus, assemblies and units of the invention may include at least partially automated control means, for instance comprising a computer.

According to an eighth aspect of the present invention, there is provided a method of conducting a fluid-phase chemical assay which involves the operation of an assay device or other apparatus in accordance with the invention. In particular, the method involves supporting a test substrate in an assay device in accordance with the first aspect of the invention, and controlling the movement of fluid into and/or out of the sample chamber in contact with the test substrate using at least one fluid control device which comprises a fluid outlet chamber in fluid communication with the sample chamber, and a displaceable flexible diaphragm the displacement of which alters the volume of the fluid outlet chamber so as to cause and/or allow and/or restrict fluid flow between the fluid outlet chamber and the sample chamber.

The method preferably involves locating a plurality of test substrates in a corresponding number of assay devices (suitably using apparatus according to the fourth aspect of the invention) and conducting a fluid-phase chemical assay in each device, simultaneously or sequentially.

BRIEF DESCRIPTION OF THE DRAWINGS

In the accompanying illustrative drawings:

FIG. 10 is a section through one of the valves seen in FIG. 9a;

All figures are schematic.

DETAILED DESCRIPTION

Embodiments of the present invention will now be described, by way of example only, with reference to the accompanying drawings.

Figure 1:
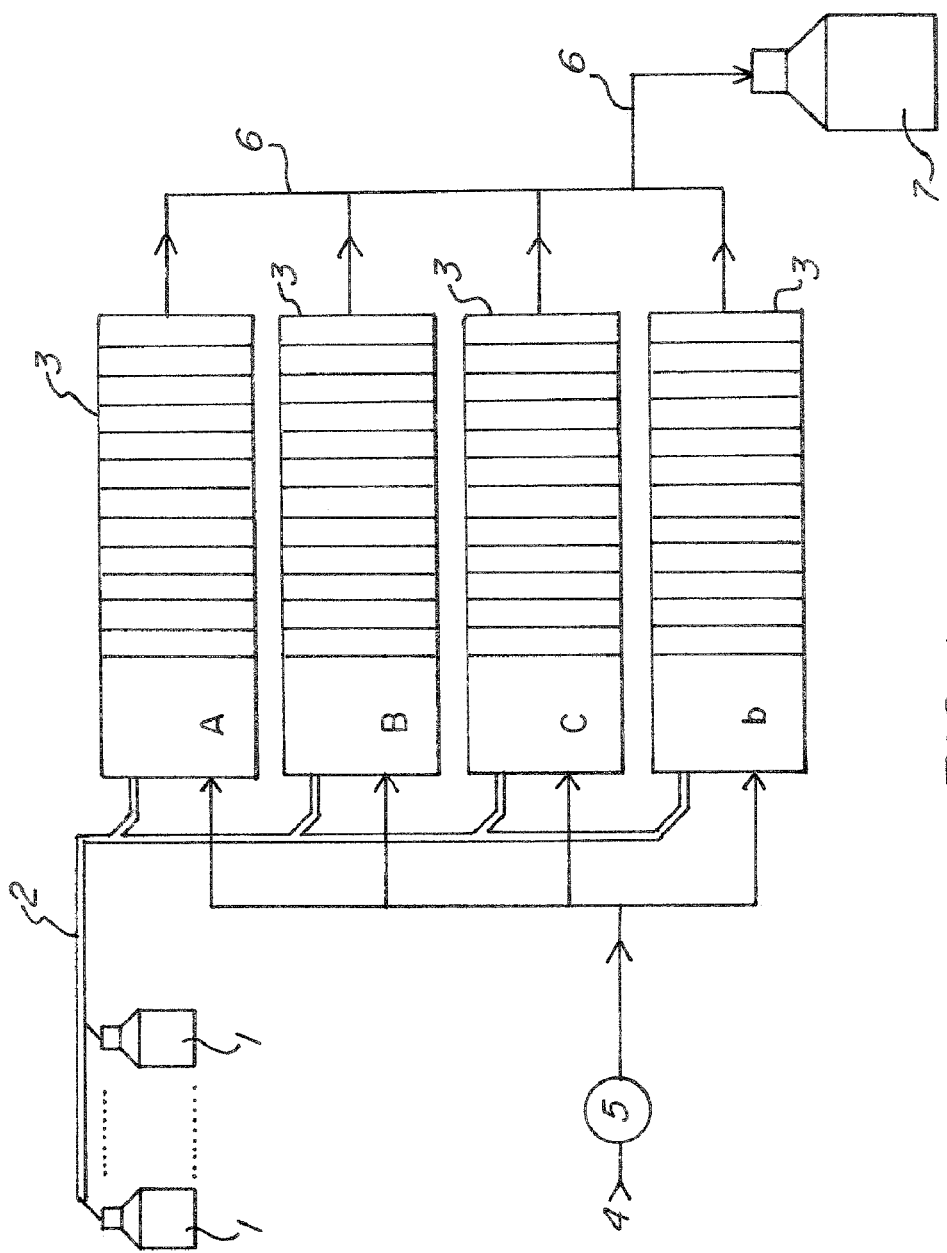
FIG. 1 shows apparatus according to the fourth aspect of the invention.

FIG. 1 shows schematically apparatus according to the fourth aspect of the invention, for use in carrying out several simultaneous chemical assays, in particular using protein arrays. The apparatus comprises reservoirs 1 of the required reagent fluids (including buffers, detergents, catalysts, wash solutions and the like and typically also, for in situ dilution of other reagents, distilled water and/or other solvents). An appropriate number of fluid supply lines, here illustrated schematically as a single conduit 2, carries fluids from the reservoirs 1 to assay stations 3, each of which houses a number of slide "cassettes" as described below in connection with FIGS. 2 and 3. The assay stations are here labelled A to D; in apparatus according to the invention there can be any desired number of such stations supplied from the same fluid reservoirs. The apparatus of the invention allows all stations to be processed simultaneously but also, if necessary, independently.

Supply line 4 carries a control fluid such as compressed air, via pump 5, to each of the assay stations 3. Conduits 6 carry fluids from the assay stations to a waste reservoir 7.

Figure 2:
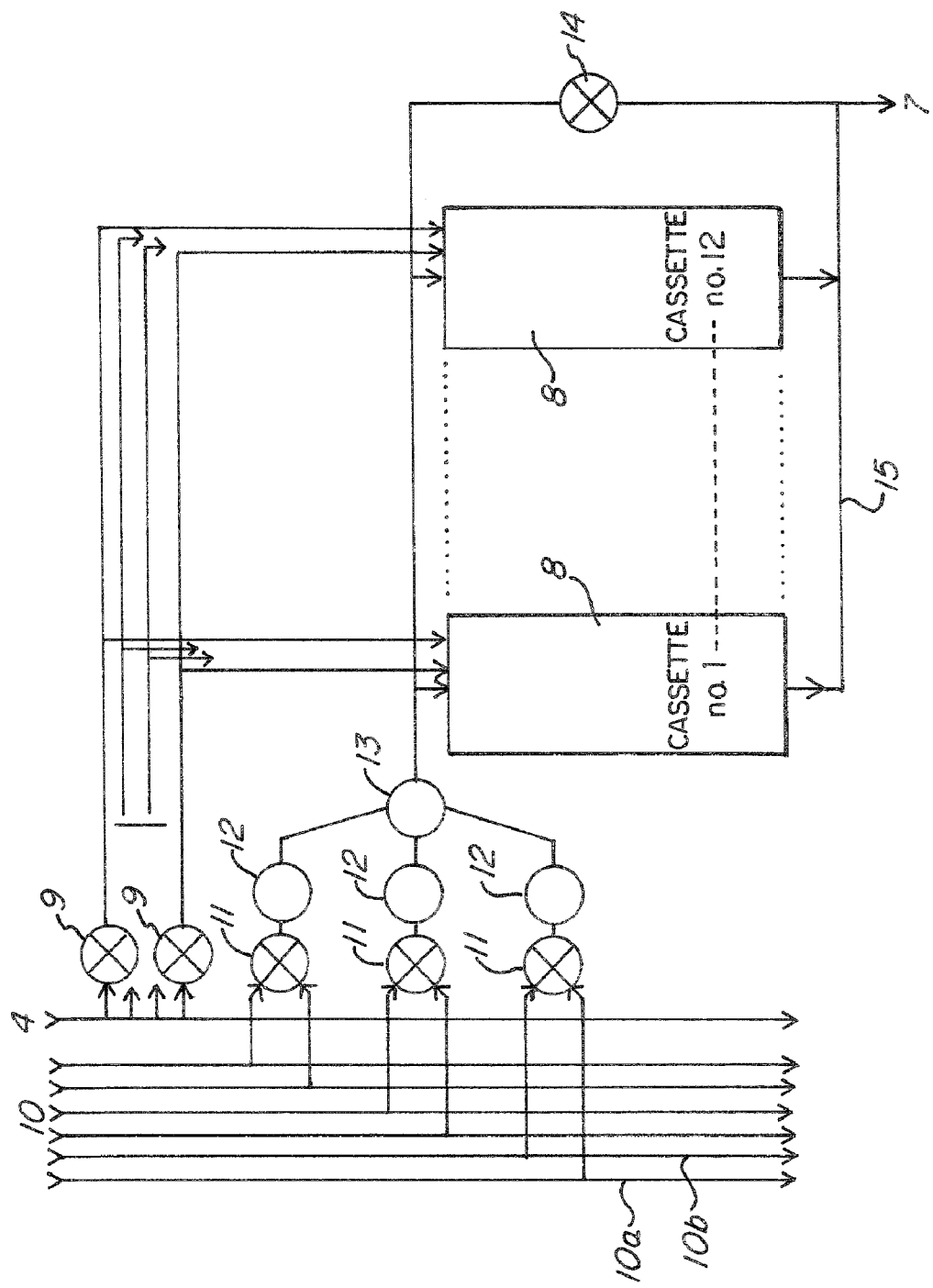
FIG. 2 shows one of the assay stations A to D from the FIG. 1 apparatus.

FIG. 2 shows, also schematically, one of the assay stations A to D from the FIG. 1 apparatus. The station supports a suitable number of, in this case twelve, slide "cassettes" 8. Each cassette holds one test substrate, typically a microscope slide having an array of probe materials (for example, antigens and/or antibodies) immobilised on it. Each cassette also provides, in association with the assay station, the fluid control devices necessary to conduct fluids to and from the test substrate it holds; these devices are described below in connection with FIGS. 3 to 10 and 17 to 25.

The assay station also includes fluid conduits, valves and pumps to control the flow of reagent and control fluids into and out of the slide cassettes. Fluid supply line 4 carries the control fluid (in this case compressed air) to the slide cassettes, via a corresponding number of valves 9. Reagent fluids are fed to the cassettes via fluid supply lines 10 (corresponding to conduit 2 in FIG. 1), selecting valves 11, pumps 12 and a further mixer 13. Any desired number of valves 11, pumps 12 and mixers 13 may in practice be used, according to requirements. A "purge valve" 14 allows the fluid conduits in the station to be purged to waste (reservoir 7, as shown in FIG. 1) with a chosen reagent fluid, bypassing the slide cassettes 8. Fluids pumped through the cassettes drain to a single outlet conduit 15 (corresponding to 6 in FIG. 1) and thence to the waste reservoir.

The FIG. 2 apparatus incorporates a fluid distribution system in accordance with the fifth aspect of the invention, which allows the relative concentrations of certain reagent fluids to be automatically and continuously varied.

Each valve 11 can in this case be selected to feed one of a pair of fluids, for instance either that carried by conduit 10a or that carried by conduit 10b, into a pump 12. The output of two or more (in this case all three) of the pumps 12 is combined in the mixing device 13, and the resultant mixture can then be fed to the slide cassettes. If only one of the pumps 12 is operated, then only a single fluid is sent to the cassettes. If more than one of the pumps is operated then a mixture of fluids may be supplied. By varying the pumping rate for each pump then the overall volumetric flow rate may be set as well as the mixing ratio(s) between the fluids feeding the pumps. In this way, either a preset mix ratio may be achieved or, if the pumps are operated at a controlled, time-varying rate, the constitution of the fluid mixture can be varied with time. For instance, two pumps may be operated with a constant combined pumping rate, but varying their pumping rate ratio between 1:0 and 0:1. The composition of the resulting fluid mixture may thereby be varied from 100% of one fluid to 100% of another, the variation following any desired pattern with time, whether continuous or step-wise.

This arrangement is of particular use for instance in supplying wash solutions of varying concentrations to the test substrates. A concentrated wash solution may be supplied to one of the pumps 12 and a diluent such as distilled water to another, allowing the wash solution to be diluted to any desired level by altering the two pump rates.

When there are three pumps, as shown in FIG. 2, two of them may be used to pump concentrated active ingredients, with variable blending between the two, whilst the third pumps a diluent (again typically water) to set the overall concentration of the active ingredient mixture. In this way the FIG. 1 apparatus need only be fed from smaller bottles of concentrated active ingredients. The pumps 12 are preferably of the positive-displacement type such as piston, peristaltic, gear or diaphragm pumps. To vary their pumping rate they are preferably driven with an electronic speed controller that optionally includes a microprocessor to calculate the pumping speed and control its variation with time.

An alternative to the variable rate pumps 12 would be the provision of variable valves in pressurised fluid supply lines. The fluid flow rates downstream of the valves would depend on the upstream pressures, the valve openings and the back pressure from downstream fluid control devices. Flow rate monitors could be incorporated to allow feedback control over the fluid flows.

Other sensing devices may be provided downstream of the mixing device 13, to provide indications of flow rate, pH, conductivity and/or other desired parameters. Measurements obtained from such sensors may then be used to adjust fluid flow rates to obtain a desired mix. Such adjustment may be real-time, using measurements taken during processing to correct the fluid mixing in a dynamic way. Alternatively, the measurements may be used during a separately conducted calibration or characterisation process. In this latter case, the performance of the pumps (or other fluid flow control devices) is characterised by analysing the fluid mix resulting from various predetermined operating rates.

The sensing devices should also be calibrated; this can be done semi-automatically using standardised solutions in the reagent reservoirs, the standards being passed individually (and unaltered) through the sensors. The sensor outputs may be used to correct subsequent sensor outputs during an assay, to achieve greater accuracy. Alternatively, calibration may be performed by setting the system to create a mix of particular (dynamically measured and real-time corrected) characteristics. This fluid may be collected and checked manually, and the process may be repeated for a variety of mixes and the results used to correct inaccuracies in the mixing and monitoring systems.

Fluid connections to the slide cassettes 8, and fluid conduits within the cassettes, are arranged to offer similar resistance-to-flow for each cassette. This means that the fluid flow will divide evenly between the cassettes. Resistance-to-flow can be matched between the cassettes by matching the length and aperture of conduits to, through and from the cassettes. Where matching is not practical for a part of a conduit (for example, in the case of a manifold), its internal cross section must be made larger and/or its length shorter to ensure its resistance-to-flow does not affect the division of fluid flow between the cassettes. Thus, the operating rates of pumps such as 12 may be used to control the rate of fluid flow through all of the cassettes.

Clearly apparatus according to the invention may include more than one mixing device 13, and a corresponding number of "sets" of valves and pumps, to allow greater versatility in the number and ratio of fluids which can be supplied to the slide cassettes.

Figure 3:
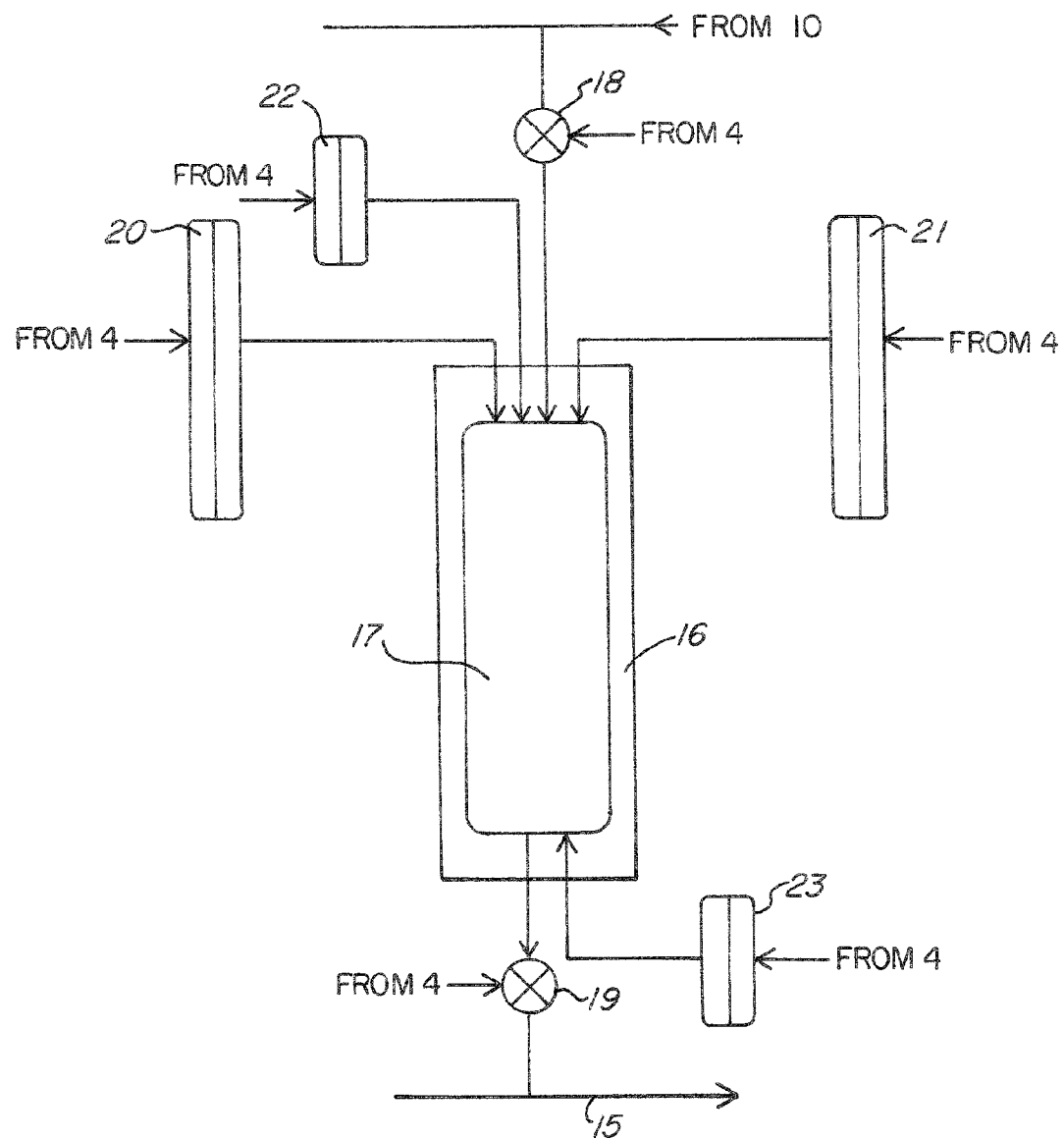
FIG. 3 shows the fluid control devices for one of the cassettes seen in FIG. 2.
Figure 4A:
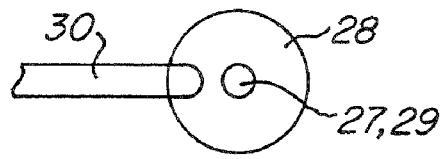
FIGS. 4a and 4b are a stylised "plan" view and a partially exploded cross section respectively of one of the valves seen in FIG. 3.
Figure 4B:
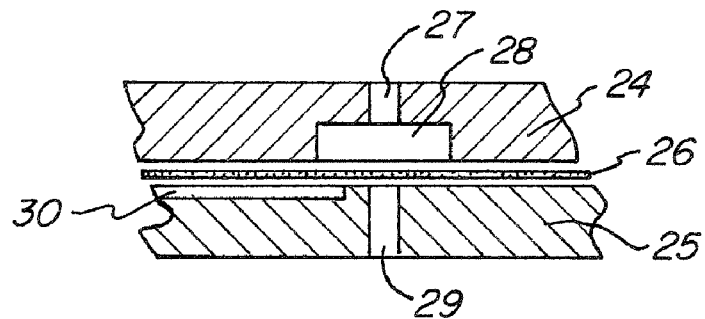

FIG. 3 shows in more detail, although still schematically, the fluid control devices in one of the FIG. 2 cassettes 8. Each cassette is an assay device constructed in accordance with the first aspect of the invention; it contains all the fluid control devices necessary for carrying out a chemical assay on a test substrate held within it, in particular devices for storing small volumes of sample fluids and injecting them into a sample chamber containing the test substrate, for agitating fluids in the sample chamber and for removing fluids from it.

FIG. 3 shows a test substrate 16 (in this case, a microscope slide carrying a protein array as described above) held in the cassette. The slide is removable from the cassette and replaceable so as to carry out further assays using the same cassette. A cover 17 provides an enclosed sample chamber over the active surface of the substrate 16.

The fluid control devices, all contained within the cassette as described below in connection with FIGS. 9, 12 and 13, include a fluid inlet valve 18 and outlet valve 19 which connect the cassette to the fluid supply lines 10 of the FIG. 2 apparatus and to the outlet conduit 15 respectively. They also include sample loading means 20 and 21, each of which comprises a fluid loading device as described below in connection with FIG. 20 and a fluid storage device as described in connection with FIG. 7. These allow storage of sample fluids and their introduction into the sample chamber. The cassette also includes agitation devices 22 and 23 which operate in tandem to move fluids back and forth through the sample chamber.

Each of the fluid control devices 18 to 23 is individually supplied with control fluid (eg, compressed air) from the supply line 4 (see FIG. 2). The control fluid supply may be independently controlled for each of the fluid control devices, using conventional fluid flow controls (not shown).

The fluid control devices 18 to 23 are all constructed using two adjacent plates with a flexible diaphragm sandwiched between them. The construction of the inlet valve 18, for instance, is shown schematically in FIG. 4a ("plan" view) and FIG. 4b (cross section). It is formed in upper and lower plates 24 and 25 respectively, with a flexible, impervious diaphragm (membrane) 26 clamped between them. The upper plate 24 carries a control port 27, to which a control fluid (typically compressed air, at for example 300 kPa) can be selectively supplied, and a control chamber 28. Lower plate 25 contains a fluid outlet port 29, leading to the sample chamber of the cassette, and a fluid inlet conduit 30. Fluid from the supply lines 10 is supplied to the conduit 30 at a moderate differential pressure (typically 20 kPa) relative to that at the outlet port 29. In the absence of pressure, the control port 27 may be vented or, optionally, a negative pressure (relative to that at outlet port 29) may be applied.

Pressure at control port 27 forces the diaphragm 26 against the upper face of plate 25 over the area of the control chamber 28. The diaphragm thus seals the end of conduit 30, preventing fluid flow through the device. If port 27 is vented (or a negative pressure applied to it) then the diaphragm is no longer clamped to the plate 25 and may move away, aided if necessary by the pressure of incoming fluid in conduit 30. This incoming fluid may then flow to the outlet port 29, and thence into the sample chamber of the cassette. In the case where the valve is "open" when its control port 27 is vented, the valve constitutes a restriction to fluid flow, which may be overcome by fluid pressure in the inlet conduit 30. In contrast, an arrangement in which a vacuum is applied to the control port in order to open the valve can present less of a restriction to fluid flow.

The supply of all necessary fluids to the sample chamber may be controlled using valve(s) of the FIG. 4 type.

The diaphragm 26 may be made from any of a variety of materials or even a combination. If the diaphragm material is thin and/or soft then little pressure is required to force fluid through the valve (supposing port 27 to be vented). In contrast, if it is thicker, harder and compressed by the clamping of the plates then a substantial pressure differential is required between ports 27 and 29 to overcome the natural sealing force provided by the diaphragm. In this latter case, fluid flow through the valve may be controlled by varying the pressure of the fluid feed through inlet conduit 30, the pressure at the control port 27 remaining constant (eg, vented).

Clearly the diaphragm should be inert with respect to the fluids passing through the valve. This may be achieved either by fabricating the diaphragm from a suitably inert material or by using a laminated structure in which a material chosen for its mechanical properties is faced by a preferably thin layer of a different, inert material. Typical diaphragm materials would be silicone rubber sheet (of hardness 45 Shore "A") faced by a polypropylene sheet. It is not necessary for the components of the laminate to be joined mechanically for the valve to function but it may aid assembly.

The operating pressure of the valve is dependent also on its dimensions. A smaller diameter for the control chamber 28 and/or a thicker diaphragm (with a correspondingly increased clamping force) would lead to a higher operating pressure. Typical dimensions for the FIG. 4 valve would be a control chamber diameter of between 3 and 6 mm, preferably between 4 and 5.5 mm, a control chamber depth of between 0.2 and 2 mm, preferably between 0.5 and 1.5 mm, such as 1 mm, and a diaphragm thickness of between 0.2 and 1.5 mm, preferably between 0.7 and 1.3 mm, such as 1 mm, for a rubber diaphragm of hardness 40-60 Shore A (preferably a silicone rubber of hardness 45 Shore A). Control port pressures in the region of 70-300 kPa, preferably 100-200 kPa, such as 150 kPa, would be required to operate such a valve.

Figure 23A:
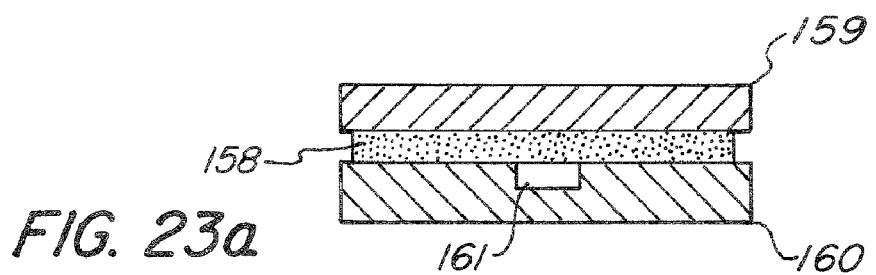
FIGS. 23a, b and c are sections through parts of fluid control devices in accordance with the invention, illustrating an alternative construction.

To prevent undesirable fluid leakage at the edges of a fluid-containing conduit or chamber such as the control chamber 28, outlet port 29 or inlet conduit 30, particularly when the fluid is at a relatively high pressure, the modification illustrated in FIG. 23 may be utilised. FIG. 23a shows schematically part of a fluid control device similar to the FIG. 4 valve, in which a flexible diaphragm 158 is clamped between essentially flat upper and lower plates 159 and 160 respectively, spanning the open end of a fluid conduit or chamber 161. The risk of fluid leakage from the chamber 161 depends on the pressure applied to the diaphragm 158 immediately adjacent the chamber edges.

Figure 23B:
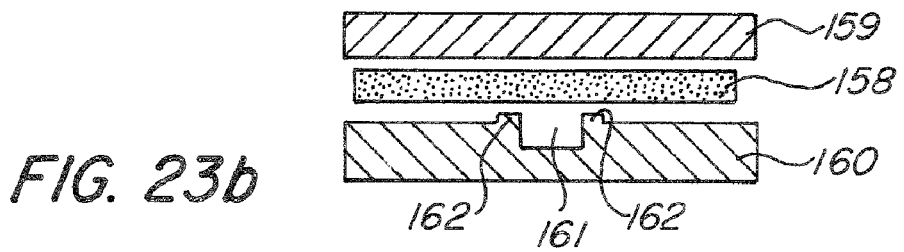
Figure 23C:
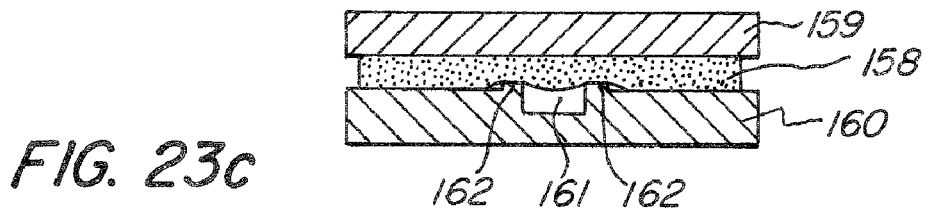

To reduce this risk, as shown in the exploded sectional view of FIG. 23b, one of the internal plate surfaces may carry raised portions such as the ridges 162 adjacent or close to the chamber perimeter; these serve to concentrate the clamping force applied to the diaphragm 158 around the chamber edges, as shown in FIG. 23c. As a result, effective leak-proof sealing can be achieved by applying a lower clamping force.

Although FIGS. 23b and c show the provision of raised surface elements in the lower plate 160, such elements could instead or in addition be provided in the upper plate 159 and/or in the diaphragm itself, in the region immediately surrounding the fluid conduit or chamber. Other forms of surface profiling, which achieve the same force-concentrating effect as the ridges 162, may be used.

The FIG. 23 modification may be used in any part of a fluid control device according to the invention where sealing of a flexible diaphragm is required around a fluid-carrying channel or cavity. In particular, the modification may be used in devices such as the valves, fluid storage devices, fluid agitation devices and fluid loading devices described below in connection with FIGS. 5 to 8, 10, 12, 13, 17 to 20, 24 and 25, and/or to enhance sealing around sample chambers.

Figure 5A:
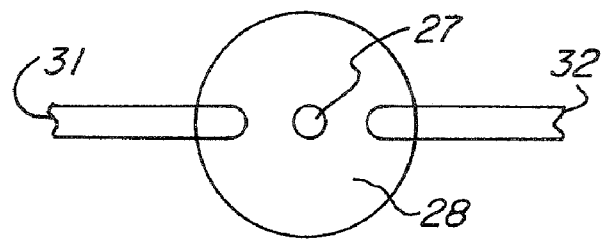
FIGS. 5a and 5b are a stylised plan view and a cross section respectively of an alternative valve useable in the FIG. 3 cassette.

An alternative inlet/outlet valve, useable as valve 18 or 19 in FIG. 3, is shown schematically in FIGS. 5a ("plan" view) and 5b (cross section). Parts corresponding to those of the FIG. 4 valve are correspondingly numbered, and similar comments apply as to their construction and operation.

Figure 5B:
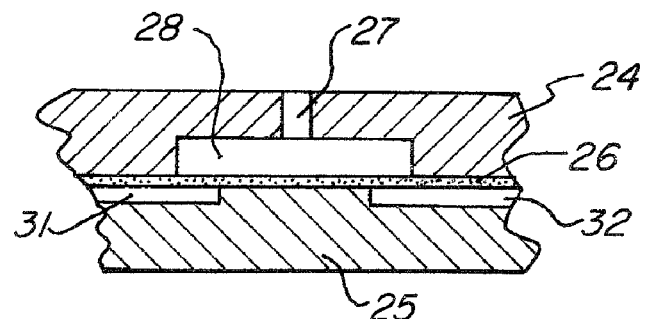

In the FIG. 5 valve, fluid inlet/outlet conduits 31 and 32 are formed as blind-ended channels in the lower plate 25; both may function as either inlet or outlet conduits in use, or the valve may be bi-directional. Control is again effected through control port 27, as described in connection with FIG. 4.

In a valve such as that of FIG. 4 or 5, it is preferred that the fluid inlet and outlet ports (the ends of the fluid inlet and outlet conduits 30 and 29 in FIG. 4) be located as close as possible to the central longitudinal axis of the control chamber (28 in FIG. 4), since efficient valve operation, and in particular effective sealing between the diaphragm and the fluid ports, is less easily achieved towards the periphery of the relatively large diameter control chamber. For example, one of the ports may be positioned on or very close to the central axis of the control chamber. The other port may also be closer to the central axis than to the perimeter of the control chamber, or at least as close.

For example, the valve control chamber may be generally cylindrical in shape and have a cross sectional diameter of about 5.5 mm. The fluid inlet, outlet and control ports might each typically have a diameter of between 0.5 and 2.0 mm, such as about 1.0 mm. In more general terms, the cross sectional diameters of the fluid ports or conduits are typically between $1/20$ and $1/5$ of that of the control chamber, and the smallest distance between the perimeters of the inlet and outlet ports (typically measured along a diameter of the control chamber) is then preferably between $1/10$ and $1/2$ times the control port diameter.

In the FIG. 4 valve, one of the inlet/outlet ports is positioned coaxially with the control chamber. The central longitudinal axis of the second port might then be spaced by 2 mm from that of the control chamber (ie, the smallest distance between the perimeters of the first and second ports would be 1 mm).

Figure 26A:
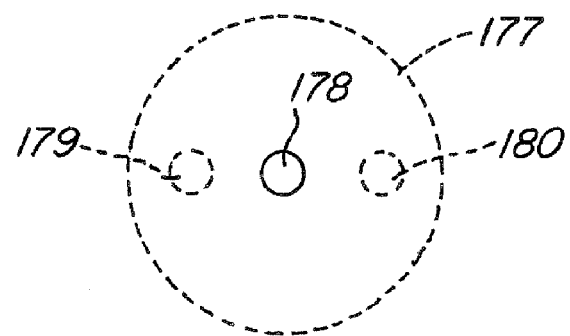
FIGS. 26a and 26b are a stylised plan view and a cross section respectively of an alternative type of valve for use in apparatus or assay devices according to the invention.
Figure 26B:
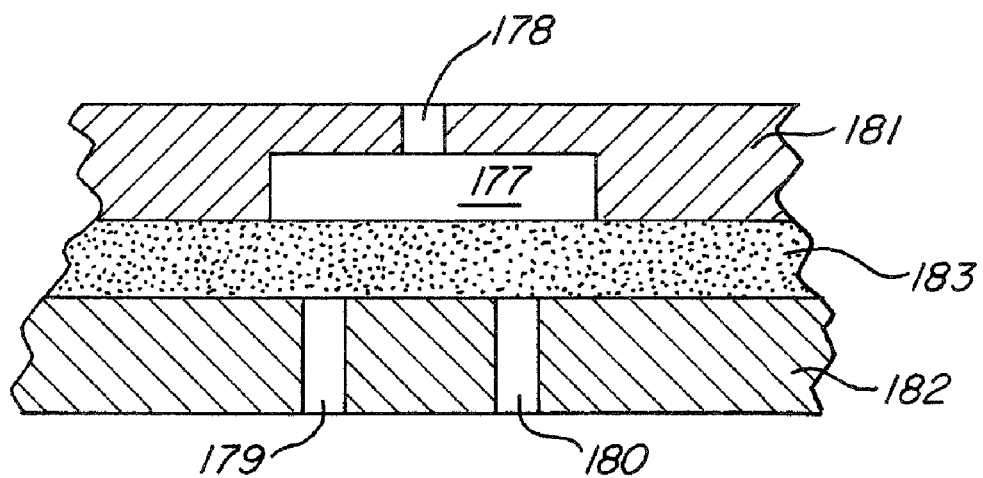

A particularly preferred alternative form of the FIG. 4 or 5 valve is constructed as shown in stylised plan view in FIG. 26a and in cross section in FIG. 26b. Reference numeral 177 represents the control chamber, 178 the control port and 179 and 180 the fluid inlet and outlet ports. 181 and 182 are upper and lower plates respectively, between which a flexible diaphragm 183 is clamped. All three fluid ports approach the control chamber with their central longitudinal axes substantially parallel to that of the control chamber. Here, the central longitudinal axis of each of the inlet and outlet ports is suitably located within a distance of $1/8$ to $1/4$ times x from the central longitudinal axis of the control chamber, where x is the cross sectional diameter of the control chamber.

Figure 17A:
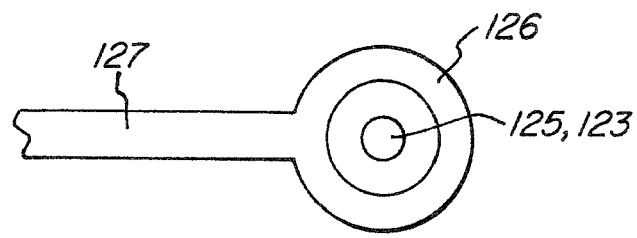
FIGS. 17a and 17b are a stylised plan view and a cross section respectively of an alternative type of valve for use in apparatus or assay devices according to the invention.
Figure 17B:
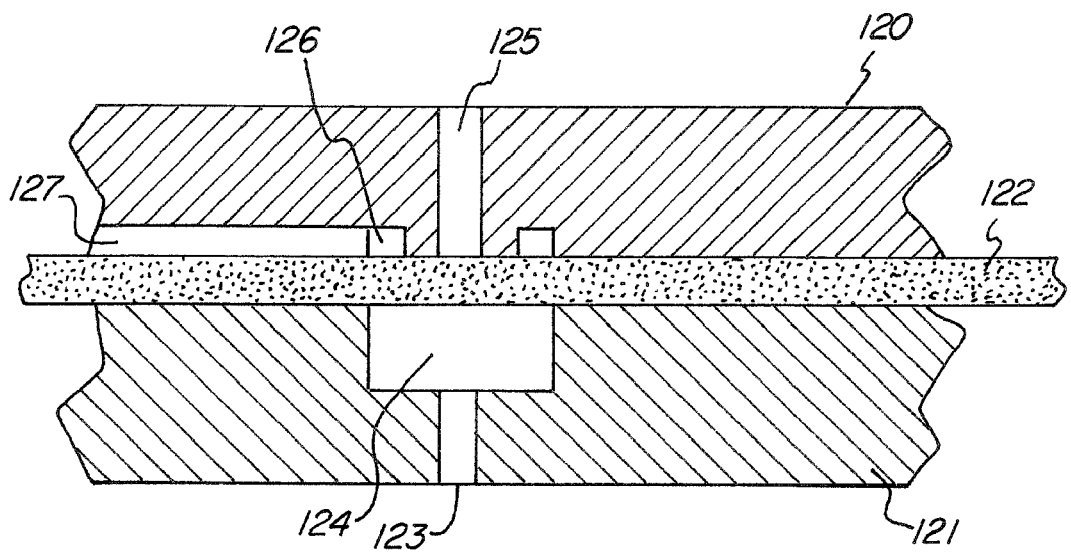
Figure 18:
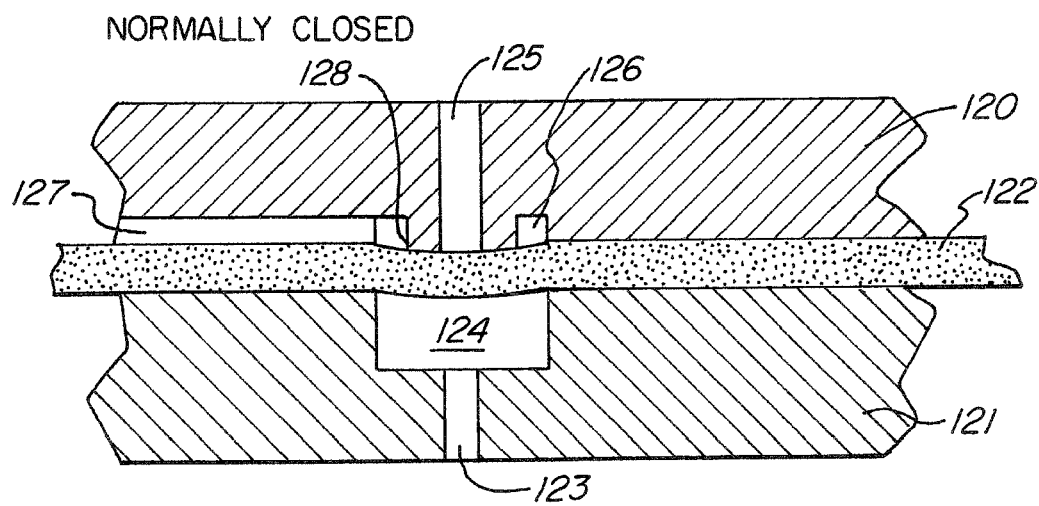
FIG. 18 is a cross section through one embodiment of the FIG. 17 valve.
Figure 19:
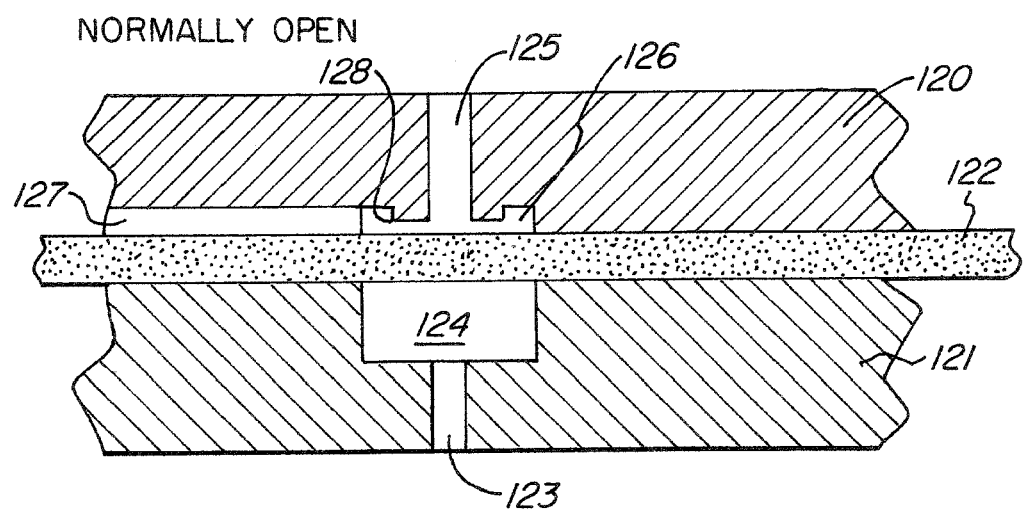
FIG. 19 is a cross section through an alternative embodiment of the FIG. 17 valve.

Further alternative valve constructions are shown in FIGS. 17 to 19. These valves, the general construction of which is illustrated in FIG. 17, are set to be either closed (the FIG. 18 valve) or open (FIG. 19) in the absence of control fluid pressure.

Referring to the schematic "plan" view of FIG. 17a and cross section of FIG. 17b, a valve is constructed between an upper plate 120 and a lower plate 121, with a flexible diaphragm 122 clamped between them. Provided in the lower plate are a control port 123 and control chamber 124, which allow pressurised control fluid to displace the diaphragm locally against the opening of a fluid port 125 provided in the upper plate. Fluid may normally flow in either direction between the fluid port 125 and an annular groove 126 and channel 127, passing between the upper plate 120 and the diaphragm 122. If however the control port 123 is pressurised, such fluid flow is prevented.

Two alternative forms of such a valve are shown in schematic cross section in FIGS. 18 and 19; their operation depends on the depth of the upper plate surface in the region 128, around the opening of the fluid port 125 adjacent the diaphragm. If the surface region 128 extends fully into the annular groove 126, as in FIG. 18, it distends the diaphragm 122. In this case the elasticity of the diaphragm provides a sealing force to close the fluid port 125, and the valve is "normally closed". The sealing force can be overcome either by excess fluid pressure (in either the fluid port 125 or the channel 127), or by application of a relatively low pressure at the control port 123.

A "normally open" valve is shown in FIG. 19. Here, the surface region 128 extends only partially into the groove 126 and is therefore clear of the diaphragm. The valve is therefore open unless a relatively high pressure is applied at the control port 123.

A "normally closed" valve is generally desirable where it is necessary to seal against fluid flow in the absence of energisation. A typical example might be a valve associated with a fluid storage or loading device, where it is desirable to load the device remotely from the rest of the assay apparatus.

A "normally open" valve has a lower resistance to flow at any given control port pressure and might therefore be preferred in locations where pressure drop is a potential problem, for instance where fluids are distributed between several assay devices and variable pressure drop across the inlet and outlet valves could cause a variable division of flow between the devices.

Figure 6:
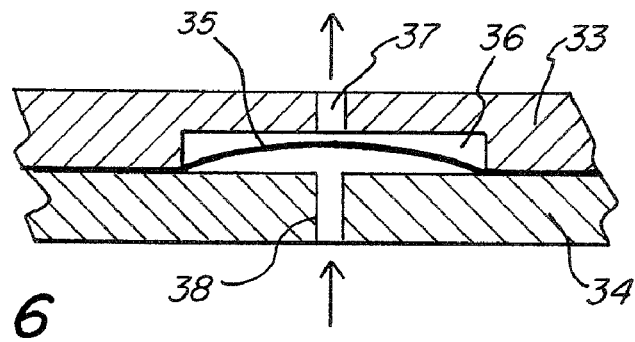
FIG. 6 is a cross section through one of the fluid agitation devices seen in FIG. 3.

FIG. 6 shows how the fluid agitation devices 22 and 23 in FIG. 3 may be constructed in a similar fashion to the valves 18 and 19. The FIG. 6 device comprises an upper plate 33, a lower plate 34 and a flexible diaphragm 35 clamped between them. A control chamber 36, typically larger than that of the valve 18, is provided in the lower surface of the plate 33. Control port 37 is supplied with control fluid from supply line 4. Fluid inlet/outlet port 38 communicates with the sample chamber of the cassette.

Using the pressure at port 38 as reference, the application of negative pressure at control port 37 draws the diaphragm 35 away from the lower plate 34 so that fluid is drawn into the device, from the sample chamber, through port 38 to fill the space between the diaphragm 35 and the lower plate 34. This situation is illustrated in FIG. 6, the arrows indicating the directions of fluid flow. Negative differential pressure at control port 37 can be achieved by applying either a negative gauge pressure to the control port or a positive gauge pressure at the port 38. Conversely, a positive pressure at control port 37 ejects fluid in the device back out through port 38.

In this way, fluctuations in applied pressure can be used to move small amounts of fluid into and out of the sample chamber, thus ensuring continuous fluid movement in the region of the test subtrate. By operating a pair of such devices in tandem through a sealed volume, back and forth fluid motion can be caused simply by applying positive gauge pressure to the control ports of the two devices alternately.

Generally speaking, gentle rather than vigorous fluid movement will be desirable throughout the assay device, in particular within the sample chamber. To achieve this, moderate pressures (eg, up to 120 kPa, for instance about 100 kPa) should ideally be applied to the fluid device control chambers (such as chamber 36 in the FIG. 6 device), and changes in control fluid pressure should be effected gradually, for instance by including a flow restrictor in the control fluid flow. Suitably a period of between 0.5 and 2.5 seconds, preferably between 1 and 2 seconds, should be allowed for a device such as a valve to be switched between states (eg, between "open" and "closed" or between "on" and "off").

The sample volume displaced by the FIG. 6 device is dependent on the volume and cross sectional area of control chamber 36 and the movement of diaphragm 35. These can be set in two ways. If the control chamber is relatively deep and the diaphragm relatively stiff then the degree of diaphragm movement is determined by the applied differential pressure. This may be an advantage in some circumstances where it is desired to change the displaced volume by remote control; varying the applied pressure, either manually or automatically, can be used to set the displaced volume. In contrast, if the chamber 36 is relatively shallow and the diaphragm more flexible then the diaphragm may be displaced by applied pressure until it substantially contacts the top face of the chamber. In this case the displaced volume is dependent more on the dimensions of the control chamber and less on the applied differential pressure. The advantage of this latter arrangement is that a predetermined volume of sample fluid, which does not vary significantly with applied differential pressure, can be displaced. This could be useful, for example, where the fluid pressure at port 38 is uncertain.

A device similar in construction to that of FIG. 6 may be used to store a small quantity of fluid (typically a sample fluid) prior to its introduction into the sample chamber of the cassette. Another sealing device (typically a valve) is required to hold the fluid within the cavity formed between the diaphragm 35 and the lower plate 34. If this sealing device is opened (which may be arranged to occur automatically under the action of excess fluid pressure) then application of pressure at control port 37 will force stored fluid out of the cavity and into the sample chamber. Such an arrangement is illustrated in FIG. 7.

Figure 7A:
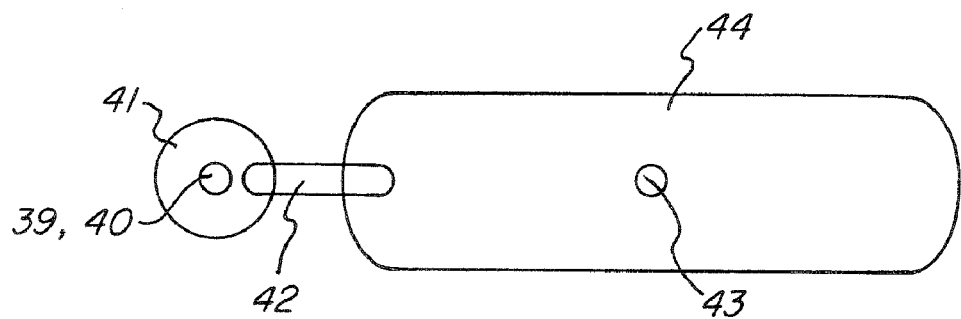
FIGS. 7a and 7b are a stylised plan view and a cross section respectively of a combination of fluid control devices such as those shown in FIGS. 4 to 6.
Figure 7B:
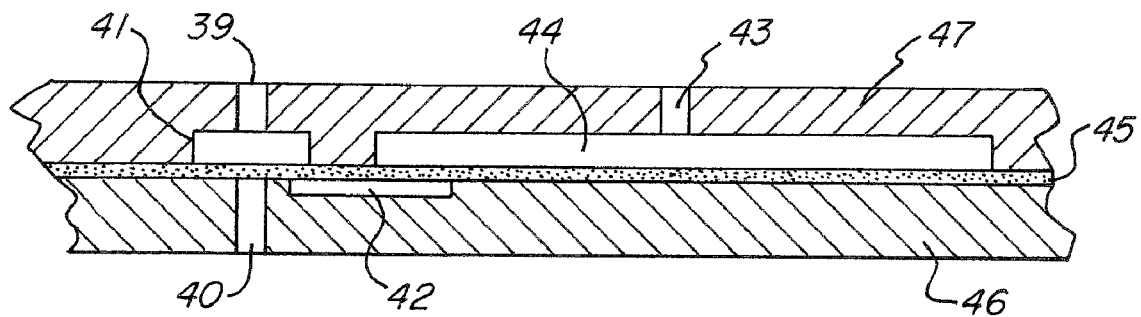

Two or more fluid control devices such as those of FIGS. 4 to 6 and 17 to 20 may be constructed together in a single unit. FIG. 7 illustrates schematically both in "plan" (FIG. 7a) and in cross section (FIG. 7b) how this might be achieved. Control port 39, inlet port 40, control chamber 41 and "intermediate" channel 42 together form a valve. Control port 43 and storage chamber 44 together function as a fluid storage device, communicating with the valve via intermediate channel 42. Fluid can be trapped in the storage chamber 44 by the action of the valve. Valve sealing may be effected either by pressure applied at port 39 or by the natural elasticity of the diaphragm 45.

To load the FIG. 7 device with for example a sample fluid, the fluid is injected under pressure through port 40. With sufficient differential pressure between ports 39 and 40, fluid is pushed from port 40, between the diaphragm 45 and the lower plate 46, into the intermediate channel 42. From channel 42 it flows into the storage chamber 44, filling the space between the diaphragm and the lower plate and distending the diaphragm as it does so.

Once the storage chamber 44 is filled, the fluid is retained by the valve (either with applied pressure or by elasticity) until pressure is applied to port 43 in the upper plate 47. This pressurises the fluid to overcome the sealing of the valve (any pressure at port 39 may be reduced or removed) and the fluid exits, via port 40, to the sample chamber. The storage chamber may thereby be either wholly or partially evacuated.

Figure 8A:
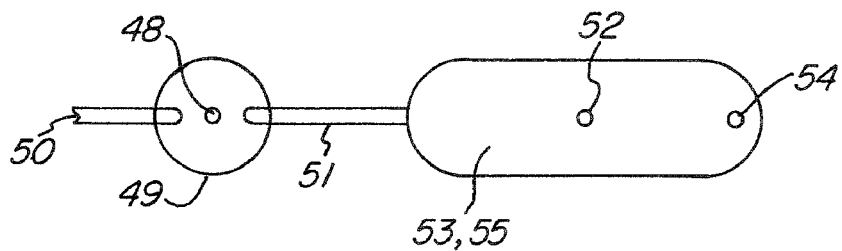
FIGS. 8a and 8b are a stylised plan view and a cross section respectively of an alternative combination of fluid control devices.

Another useful combination of fluid control devices is illustrated in schematic FIGS. 8a ("plan" view) and 8b (cross section). Here, a valve (control port 48, control chamber 49 and channels 50 and 51) is combined with a fluid agitation device (control port 52, control chamber 53 and sample fluid port 54). An outlet chamber 55 is provided in the lower plate 56, between the flexible diaphragm 57 and the port 54. In use, the fluid path is from channel 50, through the valve to channel 51 and through the agitation device chamber 55 to port 54. Reverse flow is also possible. In the absence of pressure at valve control port 48, fluid applied under pressure to channel 50 displaces the diaphragm 57 in the valve control chamber 49 to allow flow through to channel 51. If pressure is applied to control port 48 then this flow is prevented. Flow through channel 51 fills chamber 55 and the fluid can then exit through port 54 into the sample chamber. Fluid flow through the chamber 55 will substantially clear bubbles from it provided its dimensions are not too large in comparison to the typical fluid meniscus dimension. Once the chamber 55 is substantially filled with fluid the valve may be closed by application of pressure at valve control port 48.

To ensure fluid movement in the sample chamber, pressure, and optionally vacuum, can be applied cyclically to the agitation device control port 52. This makes the diaphragm 57 displace between the chambers 53 and 55, thereby displacing fluid back and forth through port 54.

An advantage of this over the previously described agitation arrangement (FIG. 6) is that the chamber 55 may be thoroughly cleared of bubbles prior to agitation. A similar arrangement may be employed in a fluid storage device such as that seen in FIG. 7, by the provision of an additional fluid port to allow the introduction of wash or other fluids into the storage chamber. Once filled with such fluid(s), the storage device can be purged by operating it as previously described, and thus washed clean and purged of bubbles prior to its re-use with fresh fluids.

Figure 8B:
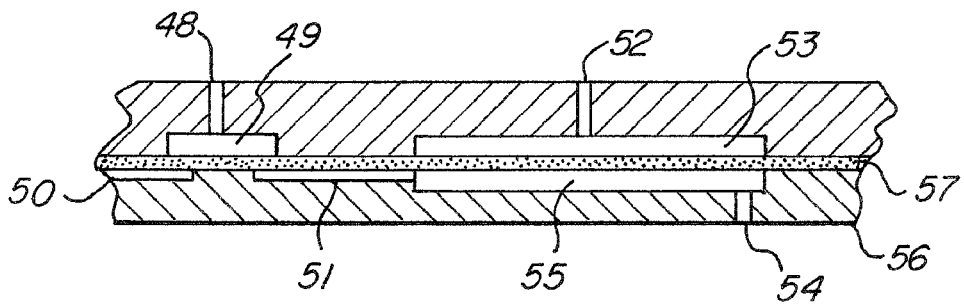

A typical assay device (cassette) in accordance with the first aspect of the present invention would have two of the FIG. 8 device combinations connected to its sample chamber, as seen in FIG. 3. Preferably, the sample fluid ports 54 of the two devices would communicate with opposite ends of the sample chamber so that operation of the agitation devices in opposition would cause fluid displacement over substantially the whole active area of the test substrate.

In an arrangement such as that shown in FIG. 8, the valve may be used to relieve excess pressure in the sample chamber, such as might be induced by raising the temperature in the chamber during a processing operation. This is achieved by applying a predetermined "threshold" pressure to the valve control chamber 49, causing the valve to open if the fluid pressure in the sample chamber exceeds that threshold.

Generally speaking, for all of the fluid control devices described above, very high or very low control fluid pressures are likely to cause undesirably rapid switching between operating positions (eg, between closed and open valve positions). This in turn may lead to sudden fluid movements which again are undesirable, especially in the sample chamber. Thus, moderate control fluid pressures are ideally used, and changes in fluid pressures effected as gradually and smoothly as possible.

It will be evident from the above that a complete set of fluid control devices for each cassette can be constructed simply from two adjacent plates and a flexible diaphragm or membrane between them Each device type can be characterised by an arrangement of chambers, conduits and fluid ports provided in the adjacent plate faces.

Figure 9A:
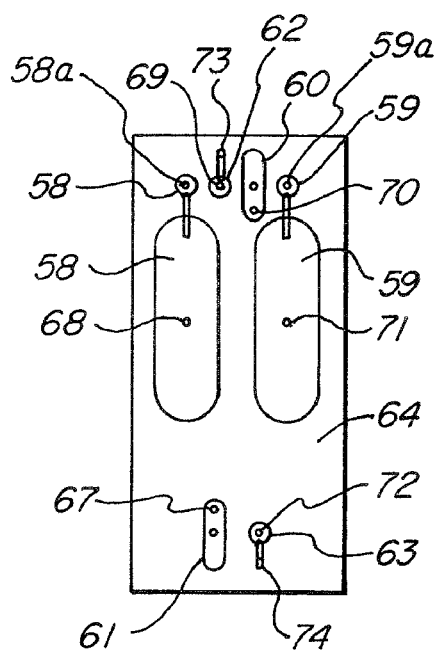
FIGS. 9a and 9b are a stylised plan view and a perspective view respectively of a fluid control unit in accordance with the sixth aspect of the invention, for use in the apparatus of FIGS. 1 and 2.
Figure 9B:
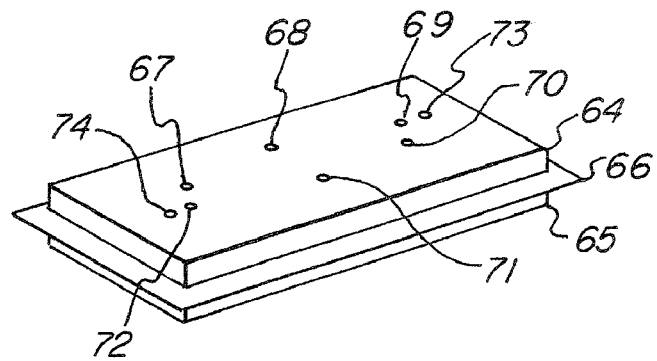

FIG. 9 illustrates a fluid control unit which can form part of an assay device (eg, the FIG. 3 cassette) in accordance with the first aspect of the invention. The unit combines two sample fluid storage devices 58 and 59, two fluid agitation devices 60 and 61 and two valves 62 and 63 (one for fluid entry into and one for fluid exit from the cassette). The storage devices 58 and 59 are shown with their associated valves, as in FIG. 7—note that the valves in this case are of the "normally closed" type illustrated in FIG. 18; they have no control port and are opened instead by excess sample fluid pressure. FIG. 9a is a stylised plan view of the fluid control unit and FIG. 9b a perspective view.

All of the fluid control devices are constructed within upper and lower plates 64 and 65 respectively, between which is clamped a flexible diaphragm 66. Holes in the upper face of plate 64 provide control ports 67 to 72, as well as reagent fluid ports 73 and 74. Sample fluid ports, which will communicate with the sample chamber in use, are provided as holes (eg, 58a and 59a) in the lower face of plate 65.

Figure 10:
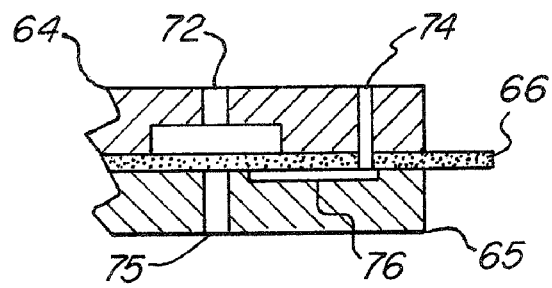

FIG. 10 is a schematic section through the valve labelled 63 in FIG. 9a. Hole 74 is a fluid inlet port, 75 a sample fluid port intended to communicate with a sample chamber and 72 the control port. When the valve is activated, fluid is allowed to flow through port 75, between diaphragm 66 and lower plate 65, through intermediate channel 76 and through port 74 (which passes through a hole in the diaphragm). Fluid may flow either from 74 to 75 or vice versa.

An important feature of the slide cassette (assay device) described above is the means to enclose a small volume of fluid in contact with the active surface of a test substrate. During a typical chemical assay, liquid needs to be passed over the substrate surface to wash it and to apply reagents. However a critical requirement is to be able to leave a small quantity of a scarce or valuable liquid (such as a biological sample) in contact with the substrate for extended periods, typically many hours. Ideally the liquid should be spread in a thin layer, covering as much as possible of the active surface of the substrate. A larger area of coverage allows a larger array of probe species to be included. While the is liquid remains in contact with the substrate, it is essential to prevent its depletion by leakage, evaporation or absorption. These requirements can be met, according to the present invention, in a compact assay device of relatively simple construction.

Figure 11A:
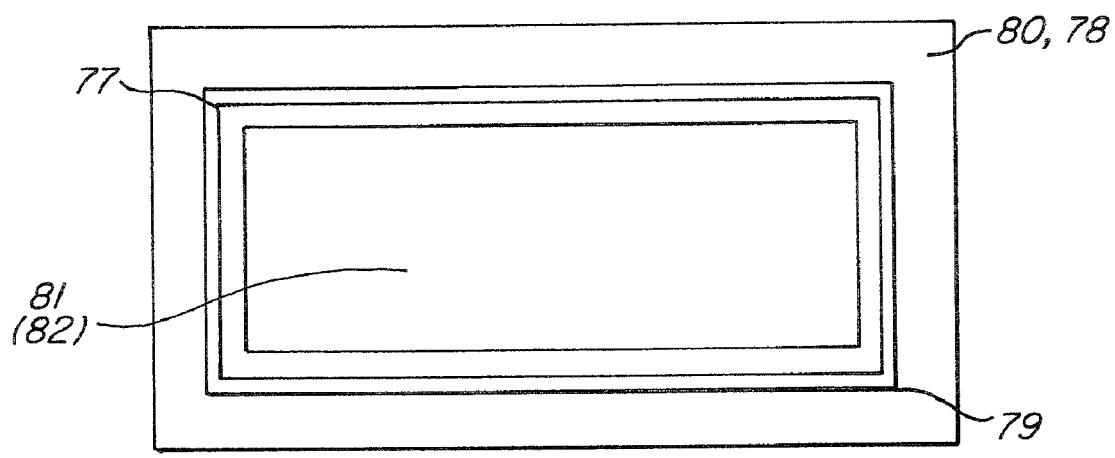
FIGS. 11a and 11b are a stylised plan view and a cross section respectively of a sample chamber of one of the cassettes seen in FIG. 2.

A preferred way in which to achieve efficient sealing of the sample chamber, in for example the cassettes 8 of FIG. 2, is illustrated schematically in FIGS. 11a, which is a stylised plan view of a test substrate and its support, and 11b, which is a cross section of the same.

Figure 11B:
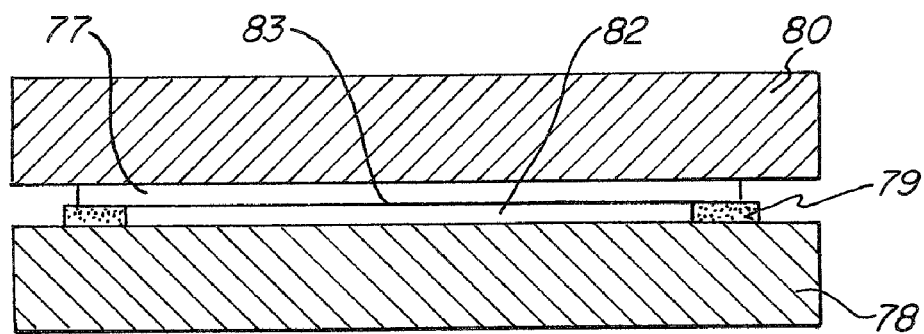

In the FIG. 11 arrangement, the test substrate 77 is clamped against a plate or block 78 with a gasket 79 between them. Typically the test substrate is a thin glass plate such as a microscope slide. A clamping plate 80 presses on the back of the slide, which is achieved using any suitable clamping means. The clamping means preferably includes some mechanical means, such as a spring, to accommodate small differences or changes in the overall thickness of the assembly. It is necessary that sufficient clamping force be applied under all combinations of component tolerance and thermal expansion/contraction or compression set (eg, of the gaskets and diaphragms in the device).

Aperture 81 in the gasket 79 defines a sample chamber (82) adjacent the active surface 83 of the test substrate. It is in this active area of the substrate that an array of probe species will previously have been placed. Gasket 79 not only seals the substrate against the plate 78 but also sets the depth of the sample chamber 82. Material for the gasket is chosen for impermeability, softness to conform to the mating surfaces and incompressibility to maintain a reliable thickness under clamping pressure. With a typical slide size of approximately 26 mm by 76 mm, a suitable overlap of the slide over the gasket at each edge is around 2 mm.

Though as small as possible a fluid depth is desirable to minimise the volume required to fill the sample chamber 82, irregularities in the slide and plates make it expensive (because of the tighter finishing tolerance required) to maintain a consistent thickness of less than a few tens of microns. Consequently, a typical sample chamber depth would be around 70 microns. At these dimensions, suitable materials for the gasket are low density polyethylene (LDPE), high density polyethylene (HDPE) and polypropylene (PP). These materials are readily available in extruded films of controlled thickness; gaskets may be cut from such films by known techniques such as punch-and-die or laser cutting or using knife tools.

For optimum sealing, it is preferable to use the softest possible material consistent with the operating temperature range. For instance, for operation between about 5 and 40° C., LDPE is suitable, whereas at higher temperatures HDPE or PP should be used. This is because, of the three polymers, LDPE has the lowest softening temperature and PP the highest. If the gasket is made from a polymer that softens at a low temperature compared to the operating temperature of the cassette then the clamping pressure may make the gasket extrude from between the test substrate 77 and the supporting plate 78.

Since polymers with higher softening temperatures are normally harder at any given temperature there is a potential sealing problem when working over a wide temperature range. A polymer suitable for withstanding the maximum operating temperature may be too hard at the minimum temperature and so not conform to the mating faces, allowing leakage. A solution to this is to use a multilayer material, for instance having a core of a harder polymer, capable of withstanding the higher temperatures, and a thinner, softer polymer laminated onto its two faces. The softer material effects the sealing but does not suffer excessive extrusion because it is such a thin layer. Its viscosity, even at the maximum operating temperature, does not allow it to extrude from between the plates even over extended processing periods.

In use, fluids may be passed to and taken from the sample chamber 82 through small diameter conduits (not shown) provided in plate 78. The internal surfaces of these conduits, and the upper surface of plate 78, are both in contact with sample fluid for extended periods and so must be made from inert materials. The surfaces must also be, and remain, flat and smooth both for efficient sealing and to prevent unwanted binding between the surfaces and species in the sample fluid. Suitable materials include stainless steel (preferably grade 316) and polymers such as polyetheretherketone (PEEK), polyoxymethylene (POM—otherwise known as acetal), polytetrafluoroethylene (PTFE) or polypropylene (PP).

A significant problem with certain polymers is their absorption of liquid solvents, particularly water. Assay samples are often formulated in aqueous solution so it is essential to minimise water absorption into the components enclosing a sample during potentially extended processing periods. Absorption into the gasket 79 is not normally a significant problem because little solvent can be absorbed into the small amount of material involved and because the area exposed to the sample fluid is very small. Absorption into plate 78 and into the test substrate itself could be much more critical. The test substrate normally poses no problem since glass, which is the typical substrate material, shows minimal absorption. Absorption into plate 78, however, may prevent use of polymers. A preferred material for the plate is therefore stainless steel, which has very low water absorptivity and may be finished to a high degree of flatness and polish (by chemical polishing, abrasive polishing or diamond facing for instance).

The sample chamber construction illustrated in FIG. 11 is compatible with the fluid control unit of FIG. 9 to create a complete assay device in accordance with the first aspect of the invention. Such a device is shown in schematic cross section in FIG. 12. It consists of three parallel plates, an upper 84, an intermediate 85 (corresponding to the lower plate 78 in FIG. 11 and also to the lower plate 65 in FIG. 9) and a lower "fluidic" plate 86 corresponding to the upper plate 64 in FIG. 9. A test substrate 87 is clamped between plates 84 and 85, with a gasket 88 (analogous to gasket 79 in FIG. 11) which serves to define an enclosed sample chamber 89. A flexible diaphragm 90 is clamped between plates 85 and 86.

Figure 12:
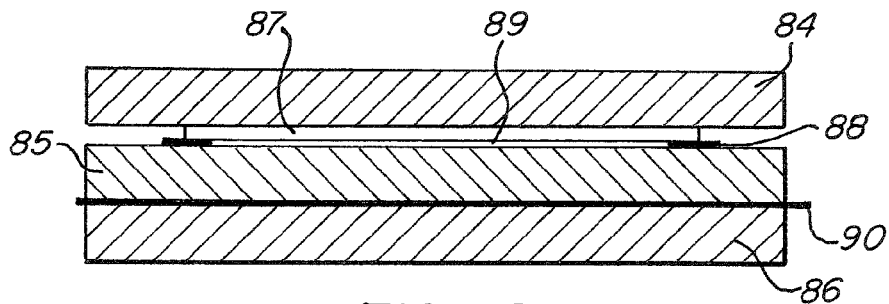
FIG. 12 is a cross section through an assay device in accordance with the first aspect of the invention, for use in the apparatus of FIG. 1.

The fluid controls for the FIG. 12 device are made up of chambers and channels (as described in connection with FIGS. 4 to 10 and 17 to 20) defined in the adjacent faces of intermediate plate 85 and fluidic plate 86, together with fluid conduits through the two plates and the diaphragm 90. Such chambers, channels and conduits are omitted from FIG. 12, for simplicity.

In this case, the assay device might include:
i) two sample storage and injection devices, as illustrated in FIG. 7, communicating with the sample chamber 89;
ii) two inlet/outlet valves, as illustrated in FIG. 4, 5, 10 or 17 to 19, to control fluid flow from external reservoirs to the sample chamber or from the sample chamber to waste; and
iii) two fluid agitation devices, as illustrated in FIG. 6 or FIG. 8, to move fluid contained in the sample chamber back and forth across the active surface of the test substrate 87.

Figure 20:
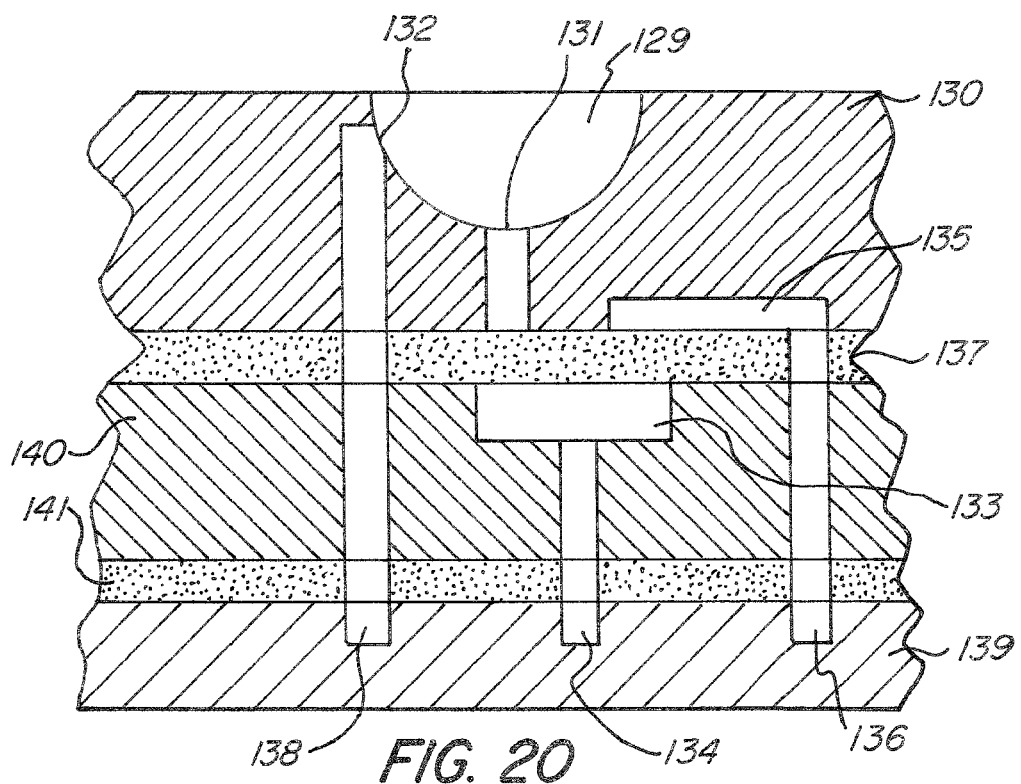
FIG. 20 is a cross section through a fluid loading device for use in an assay device according to the invention.

An assay device such as that of FIG. 12 may also incorporate one or more fluid loading devices of the type shown in schematic cross section in FIG. 20. This comprises an open cup-shaped recess 129, of approximate volume 50-100 µl, provided in the outer surface of upper plate 130. The "cup" 129 has first and second outlets 131 and 132 respectively.

Outlet 131 leads to a valve which is constituted by a control chamber 133, a control port 134, an intermediate chamber 135 and a fluid outlet port 136. The valve is operated by the supply of control fluid to the control chamber 133 which causes displacement of the diaphragm 137 and thereby controls fluid flow either into or out of the cup 129. In this case, fluid outlet port 136 leads to a sample chamber.

The second outlet, 132, from the cup leads to waste (outlet port 138).

The FIG. 20 device is provided in a three-plate construction which includes not only the upper plate 130 but also a pair of lower plates 139 and 140. A second flexible diaphragm 141 is located between the two lower plates. Such a construction has the advantages described below in connection with FIG. 25.

Figure 21:
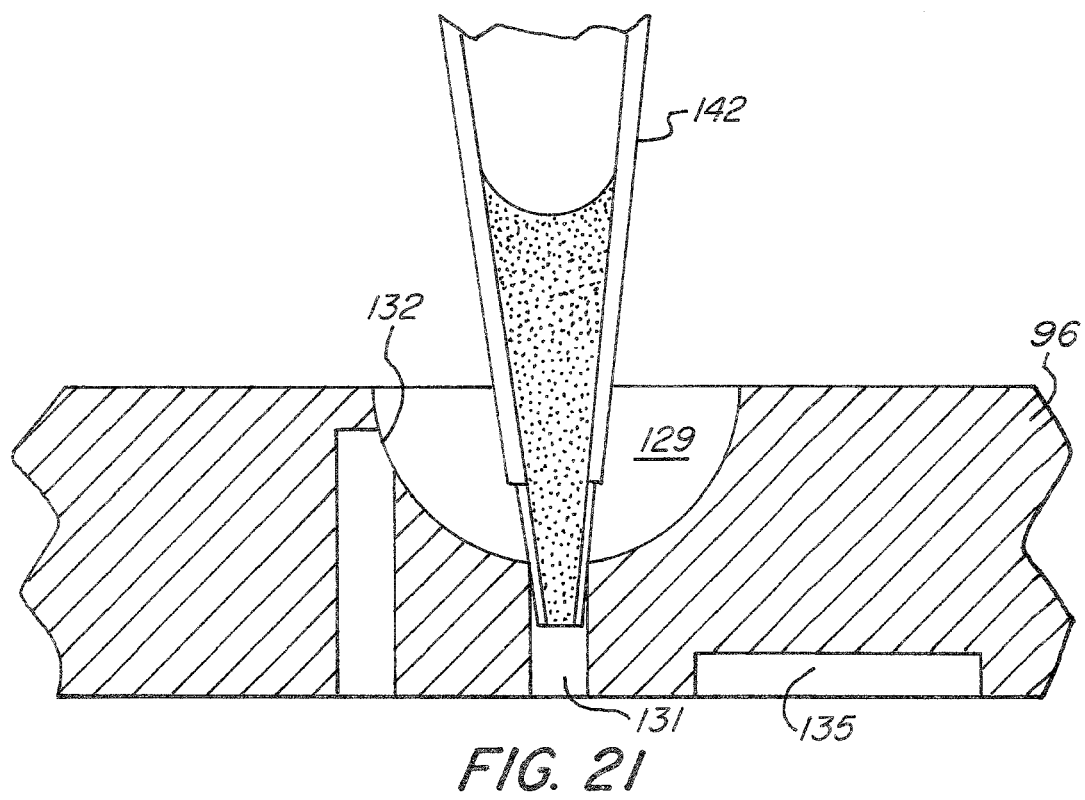
FIG. 21 is a section through part of the FIG. 20 device during a typical fluid loading operation.

Fluid may be loaded into the cup 129 either directly or, as shown in FIG. 21, by insertion of a pipette tip 142 into the first outlet 131. The mouth of outlet 131 is specially adapted to accommodate a standard pipette tip.

The valve associated with the FIG. 20 loading device is analogous in operation to those described in connection with FIGS. 4, 5, 10 and 17 to 19. To open the valve, a low pressure is applied to its control chamber 133, This causes a local downwards displacement of the diaphragm 137, which allows fluid flow either to or from the cup 129. The application of a higher pressure to the control chamber 133 seals the diaphragm 137 against the upper plate 130, preventing fluid flow into or out of the cup.

The FIG. 20 device may be used to load fluids into other parts (in particular the sample chamber and/or fluid storage devices) of the assay device, and to evacuate fluids from other parts such as the sample chamber. It may also be used in the washing of the sample chamber and other apparatus parts.

A typical sample loading operation would involve dispensing sample liquid either directly into the cup 129 or via a pipette as shown in FIG. 21. If the cup has previously been washed (as described below), then a small quantity of wash liquid will remain in it and this ensures that the sample can be delivered to the valve inlet under a liquid surface so that no bubbles can be trapped.

Sample aspiration may then be achieved by opening the control valve so as to draw the sample liquid through into the sample chamber by vacuum applied downstream of the valve. This could be done for instance by operating a fluid storage device (of the type described in connection with FIG. 7) to suck the liquid in.

Just as liquid can be drawn in from the cup 129 by vacuum, similarly it may be expelled to the cup (or to a pipette tip inserted into the cup outlet 131) by appropriately applied pressure.

A typical washing operation may be achieved using the FIG. 20 device by introducing a wash liquid to the valve (for instance via the port 136) under slight pressure. Vacuum is then applied to the control chamber 133, allowing the wash liquid to feed into the cup 129. Vacuum applied to the waste port 138 removes excess liquid from the cup, taking contaminants away with it. Any bubbles trapped in the valve, in particular in its inlet conduit, are also purged in this process. Once the supply of wash liquid is stopped, fluid in the cup drains down to approximately the level of the waste outlet 132.

Figure 22:
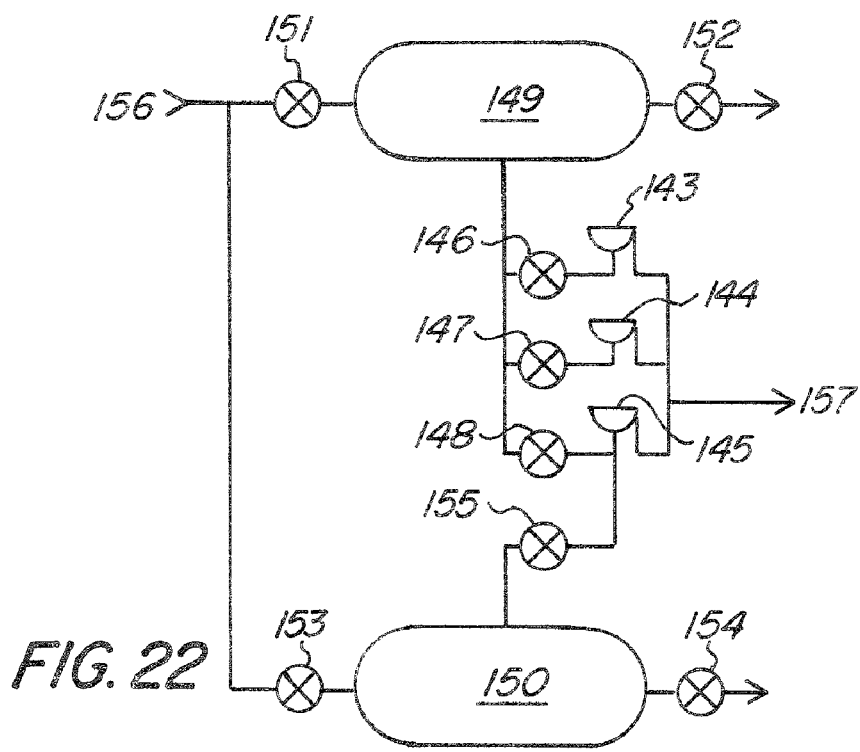
FIG. 22 shows an arrangement of fluid loading devices and other fluid control devices useable in an assay device according to the invention.

FIG. 22 shows schematically how a group of fluid loading devices, of the type shown in FIG. 20, may be used together in an assay device according to the invention. Here three loading devices, 143 to 145, are illustrated. Each has an associated valve (146 to 148 respectively). Items 149 and 150 are fluid storage devices, each associated with a sample chamber in which an assay is to be conducted. Items 151 to 155 are further fluid flow control valves. Conduit 156 is connected to a source of wash fluid, and conduit 157 leads to waste.

All three loading devices are in fluid communication with storage device 149, and loading device 145 is additionally in fluid communication with storage device 150. All three loading devices may be used to deliver fluids to storage device 149 and to evacuate fluids from it (for instance, previously stored or assayed sample fluids, or wash liquids). All three loading devices may be washed with fluid supplied via the storage device 149. In addition, device 145 may deliver fluids to or receive fluids from the storage device 150. Fluids may also be transferred between all three loading devices via the storage device 149.

The capacities of the loading device "cups" may be sufficiently great that they may be only partially filled or emptied in any given fluid "transaction". Thus, for example, device 145 may be used to dispense aliquots of fluid to both the storage devices 149 and 150.

A major advantage of the FIG. 22 arrangement is the flexibility it offers in terms of fluid movements. It makes possible not only the storage of small quantities of a number of different fluid samples, but also the drawing of more than one fluid sample from each loading device and the supply of fluid to any given sample chamber or storage device via more than one loading device. Operation of the loading devices can moreover be automated, conveniently via operation of other fluid control devices in the surrounding apparatus, with which the fluid loading devices are operationally compatible.

The fluid loading devices also offer the ability to purge air bubbles trapped in the device, whilst their compatibility with conventional laboratory pipettes makes them straightforward to use.

Ideally, fluid loading device(s) are located in the assay device of the invention in reasonably close proximity to the sample chamber. There may however be cases in which one or more fluid loading devices are provided at a different location, for instance as part of an assay station at which one or more assay devices are to be processed.

Fluid connections are made to the FIG. 12 assay device through holes (not shown) in the lower face of fluidic plate 86, for entry and exit of sample and reagent fluids and also of control fluid for the valves and other devices. These connections may be made by individual tubes. However, in a system which has several such assay devices or "cassettes" at an assay station, there will be many such connections and high cost may result. An alternative connection method is to combine the fluidic plates 86 of several cassettes into a single plate. In the lower face of this plate are fabricated channels to distribute and collect the various fluids to and from the cassettes. At least some of the fluid control devices and fluid distribution conduits may therefore be common to more than one assay device.

Figure 13A:
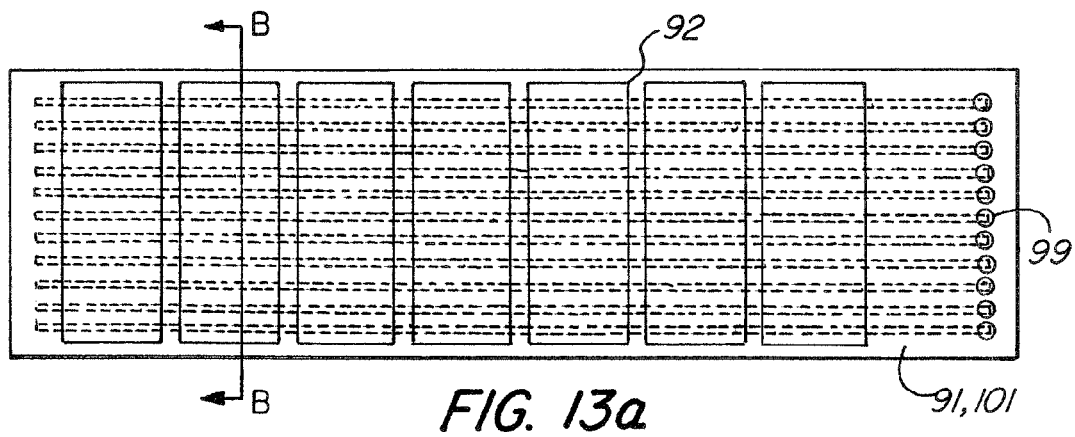
FIGS. 13a and 13b are a stylised plan view and a cross section respectively of part of an assay station for use in the FIG. 1 apparatus.
Figure 13B:
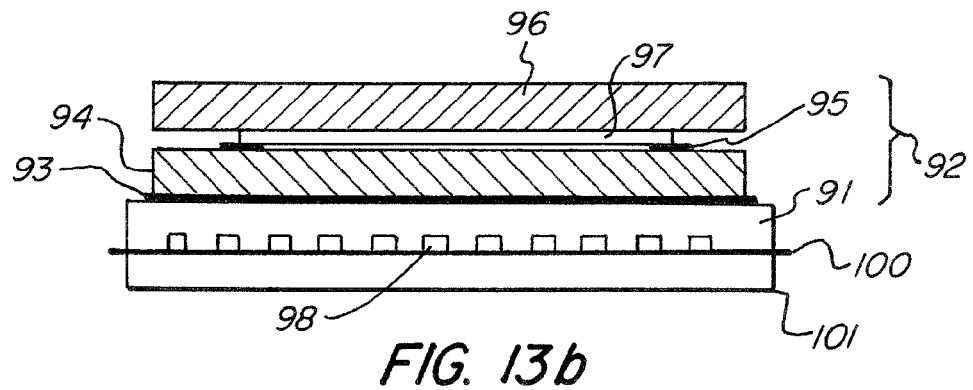

Such an arrangement is shown in stylised "plan" view and in cross section in FIGS. 13*a* and 13*b* respectively, FIG. 13*b* being a section along the line B-B in FIG. 13*a*. Here, fluidic plate 91 is common to seven assay cassettes 92 (in general, there may be any desired number of cassette locations in an assay station such as that of FIG. 13). Each cassette comprises a diaphragm 93, an intermediate plate 94, a gasket 95 and an upper clamp plate 96. A test substrate 97 is shown clamped inside the cassette seen in FIG. 13*b*, in an arrangement similar to that of FIG. 12.

The lower face of the fluidic plate 91 provides a number of channels 98 which run beneath all of the cassette locations. The channels 98 are closed at either end except for fluid connection ports 99 through the upper face of the plate. Though they may be fabricated as closed tubes within the body of plate 91 (eg, by drilling or extrusion), it is more economic to fabricate them in the plate face and then close them off with a sealing gasket 100 and gasket plate 101, as shown in FIG. 13*b*. The gasket plate 101 may be clamped to fluidic plate 91 by any convenient method.

Holes through the fluidic plate 91 in selected positions allow communication between the channels 98 and the fluid control devices in the upper face of the plate and/or the intermediate plate 94, for each cassette position. Using the fluid ports 99, liquids and gases may thus be supplied to the cassettes 92 via the channels 98. Any of the channels 98 may connect either to a single fluid control device of a cassette or to a particular type of device across all the cassettes. A preferred set of channel functions is listed below.

(i) liquid (typically wash and/or reagent liquid) source to all cassettes
(ii) to (viii) control fluid source for input valves in cassettes 1 to 7 respectively
(ix) control fluid source for agitation device A (all cassettes)
(x) control fluid source for sample A storage/injection device (all cassettes)
(xi) control fluid source for sample B storage/injection device (all cassettes)
(xii) control fluid source for agitation device B (all cassettes)
(xiii)-(xix) control fluid source for output valves in cassettes 1 to 7 respectively
(xx) liquid outlet from all cassettes.

With this combination of fluid control devices it is possible to blank off individual cassettes so that the assay station may be processed with fewer than seven test substrates in place. Otherwise control is common to all cassettes so that they run synchronously.

A "sub-assembly" such as that of FIG. 13 includes all of the fluid control devices necessary for each cassette. The sub-assembly can form part of an assay station as shown in FIG. 1, the remaining control elements including the pumps and valves shown in FIG. 2. Preferably, the FIG. 13 sub-assembly is built as a module that can be easily and quickly removed from a station of which it forms a part. Fluid and electrical connections to the sub-assembly can be made via ganged connectors to facilitate this.

Figure 24A:
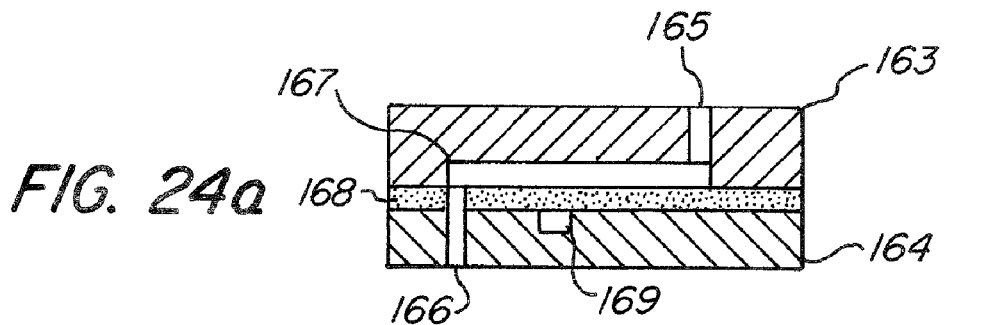
FIGS. 24a and b are respectively a section through part of a fluid control device in accordance with the invention and a stylised plan view of the same.
Figure 24B:
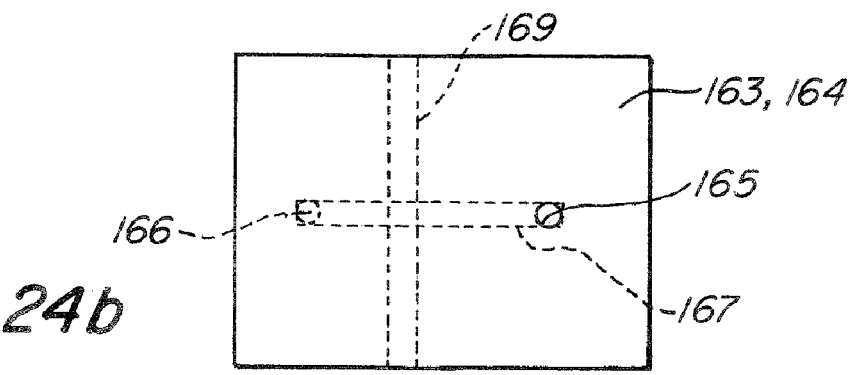
FIG. 24c is a section corresponding to that in FIG. 24b showing the device during operation.
Figure 24C:
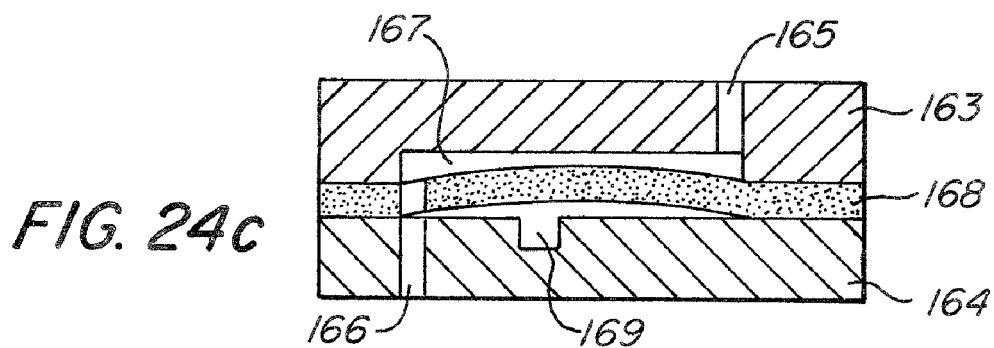

In fluid control devices of the types described above, and in assemblies or sub-assemblies incorporating such devices, it may be necessary for a fluid conduit or chamber provided in one plate to overlay, at least partly, another conduit or chamber provided in an adjacent plate. Such a situation is illustrated in FIG. 24a, which is a section through part of a fluid control device formed between upper and lower plates 163 and 164 respectively, in which fluid ports 165 and 166 and their common fluid conduit 167 are separated by the flexible diaphragm 168 from fluid conduit 169 in the lower plate. The arrangement is shown in stylised "plan" view in FIG. 24b, the conduits within the structure being illustrated by dashed lines. FIG. 24c is a section corresponding to FIG. 24a, but illustrating how, when the fluid pressure in conduit 169 is higher than that in conduit 167, displacement of the diaphragm 168 may be sufficient to allow fluid leakage from conduit 169 along the interface between the diaphragm 168 and the lower plate 164.

Figure 25:
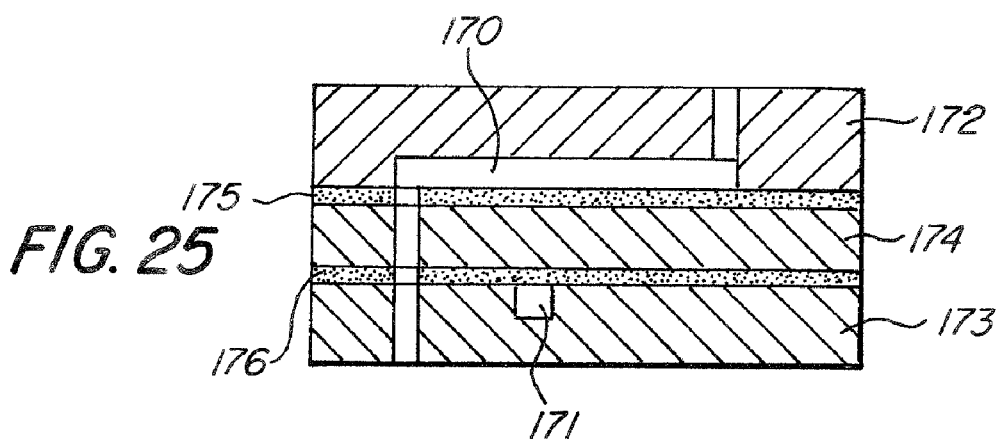
FIG. 25 is a section corresponding to that in FIG. 24a but through part of an alternative fluid control device in accordance with the invention.

This problem may be overcome or at least mitigated by providing an "inner" plate between the two plates in which the relevant overlapping conduits/chambers are defined. Such an arrangement is illustrated in FIG. 25, in which overlapping fluid conduits 170 and 171, provided in upper plate 172 and lower plate 173 respectively, are separated by a plate 174 sandwiched between two flexible diaphragms 175 and 176. All three plates are made from a suitable rigid material such as stainless steel, a ceramic material or a rigid plastics material. The inner plate 174 transmits clamping forces over the whole mating surface of each of the upper and lower plates, avoiding unsupported regions in the flexible diaphragms which might otherwise-allow fluid "tunnelling" between the diaphragms and adjacent plates.

Any of the fluid control devices of the invention, including those described above and in particular the FIG. 26 valve, may be constructed using an arrangement of the form shown in FIG. 25.

A further optional feature of apparatus in accordance with the invention is a device for monitoring the fluid flow rate through one or more of the apparatus parts, in particular through assay devices. This is desirable firstly in order that malfunctions may be detected and secondly so that pumping rates may be adjusted to achieve a desired flow rate.

Figure 14:
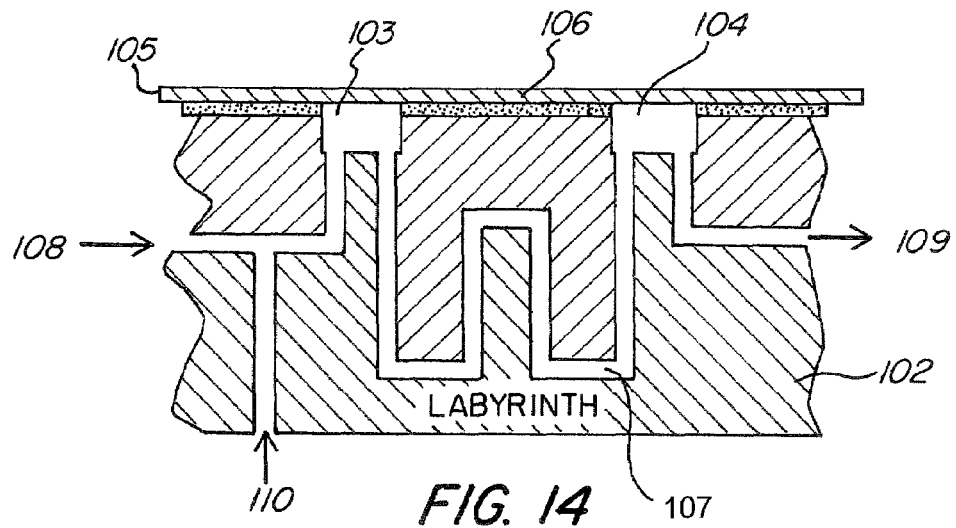
FIG. 14 is a cross section through a flow rate monitoring device in accordance with the invention, for use in the FIG. 1 apparatus.

A flow rate monitoring device in accordance with the third aspect of the present invention, for use for example in the apparatus of FIG. 1, is shown in schematic cross section in FIG. 14. It is provided in a fluidic plate 102, which may simply be an extension of the fluidic plate, such as 91 in FIG. 13, of an assay "cassette". Two cavities, 103 and 104, are machined into the fluidic plate. They are closed by clamping a printed circuit board (PCB) 105 to the upper face of plate 102 with a gasket 106 between. The cavities communicate with each other via a labyrinth 107 of fluid conduits provided in the body of plate 102 (this labyrinth may have any desired geometry). Fluid from an assay cassette may enter the device at port 108 and exit, typically to waste, at port 109. Port 110 allows injection of a gas, the purpose of which is described below. The arrows indicate the directions of fluid flow in use.

Fluid (typically liquid) filling the cavities 103 and 104 comes into contact with the face of the PCB 105. Its presence can be detected in either cavity by detecting a change of conductance or capacitance between conductor traces provided on the lower face of the PCB; the electronics to do this may be provided either on the PCB itself or remotely. This provides a digital indication of the presence or absence of liquid in the cavities.

To measure flow rate, a small bubble of gas is injected, via port 110, into the liquid flowing through the FIG. 14 device. The dimensions of the fluid conduits and cavities in the device are such that the bubble fills the cross section and propagates along with the liquid flow. As it passes the PCB sensors associated with cavities 103 and 104, a controlling computer detects this and measures the time taken for the bubble to pass through the labyrinth 107. From this, an approximate liquid flow rate can be calculated.

An additional benefit of the FIG. 14 device is that it can also check for the presence of bubbles during "normal" liquid flow, for instance as a quality check during purging.

If the speed of gas injection at port 110 can be held sufficiently uniform, it may be possible to achieve sufficient accuracy with a single cavity and PCB sensor, the interval between gas injection and sensing being the measured parameter.

Clearly, the PCB must be compatible with the fluids present; this may be achieved for instance by constructing the PCB from gold-plated tracks on an epoxy substrate.

Optical or other alternative detection means may be used instead of the PCB to detect the presence or absence of liquid in the cavities.

The FIG. 14 device may be inserted in any desired liquid flow. For instance, if the flow rate through each of the cassettes needs to be measured independently then one device per cassette is required. Preferably the device is positioned downstream of the cassette, to prevent the injected gas bubbles affecting assays being conducted in the cassette.

The gas injection port could conveniently be common to a number of cassettes. To prevent liquid flowing along this common connection, which would affect the gas injection, a valve of the type shown in FIG. 5 could be inserted into the gas supply line. This valve could be operated either through its control port 27 or simply by the pressure of the gas feed overcoming the natural sealing of the diaphragm 26.

It will be evident that both the flow rate monitoring device and any associated valve(s) can be fabricated as features in the plates 91, 94 and 101 of a cassette (see FIG. 13), making use of the diaphragms 93 and 100 between them. This minimises the overall cost of the cassette as the components of all the fluid control devices can be fabricated at the same time.

During a chemical or biochemical assay it is usually necessary to control the temperature of the test substrate and the fluids in contact with it. This may involve heating to temperatures above ambient and/or cooling below ambient, often "cycling" between different operating temperatures at different times during the processing.

Using apparatus in accordance with the present invention, temperature control may be effected in a variety of known ways such as by:
  i) passing, heated or cooled air over the whole assembly;
  ii) allowing heated or cooled liquid to flow against or through any convenient part of the assembly, provided there is good thermal conductivity between that part and the remainder;
  iii) electrical resistance heating of such a part; and/or
  iv) Peltier heating or cooling of such a part.

Figure 15:
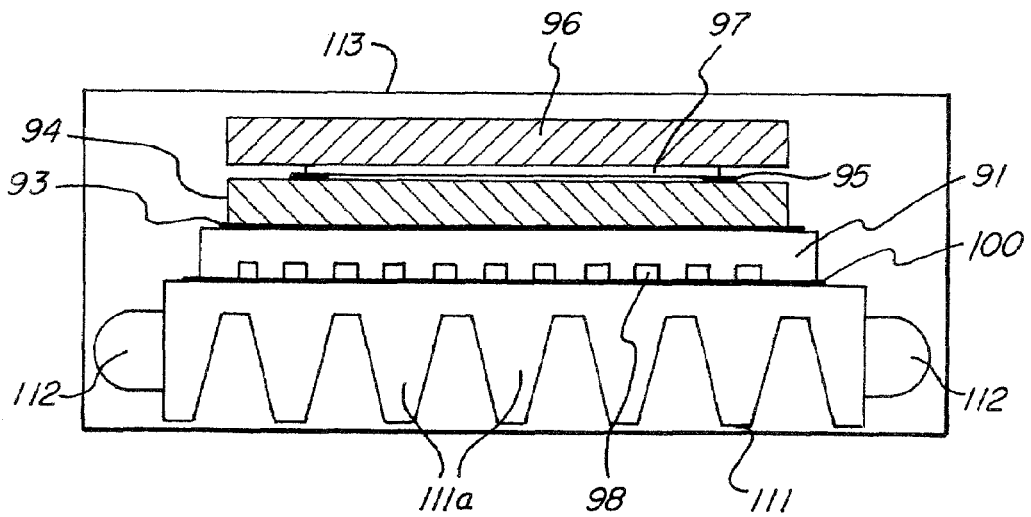
FIG. 15 is a cross section through part of an assay station of the type shown in FIG. 13, in combination with temperature control means.

A preferred temperature control means is illustrated in schematic cross section in FIG. 15, in combination with a cassette of the type shown in FIG. 13 (like parts are labelled with the same numerals). In this case, the lowermost plate 111 is an extruded (for instance, aluminum) heat sink of the type conventionally used in electronic systems, having a number of cooling "fins" 111a. In this case the heat sink can also itself be heated, by means of electrical heaters 112 connected to it. Applying power to these heaters raises the temperature of the heat sink 111 and, by conductivity, of the associated cassette. The temperature may be monitored by any convenient means, such as platinum resistance or thermocouple sensors. Using an automatic temperature controller, the temperature of the assembly may be stabilised at any desired level above ambient.

An enclosure 113 fits around the whole assembly to minimise convection and other draughts and hence temperature differences within the assembly. However the natural cooling rate of the assembly, in the absence of heater power, is then reduced, which in turn could slow down its overall operating rate and even be deleterious to the test process itself. Faster cooling may therefore be achieved using a flow of air forced through the heat sink 111 by an electrically driven fan (not shown). Such a fan could also be under the control of the automatic temperature controller system so as to be activated automatically when cooling is required. If cooling below the ambient temperature is required then air drawn in by the fan must be precooled using any of a variety of known techniques.

Apparatus in accordance with the fourth aspect of the present invention may include any desired number of assay stations, as shown in FIG. 1, each station having a plurality of cassette locations. The apparatus described above, in connection with FIGS. 1 to 15 and 17 to 25, allows processing with any combination of cassettes and assay stations active.

As a result of common fluid connections, active cassette positions within a station can be partly interdependent. Each station, however, can operate entirely independently. A controlling computer or other sequencer may be used to operate the valves, pumps, heaters and other devices necessary to execute a pre-programmed processing sequence at one or more stations.

The following describes how the apparatus might typically be operated, by reference to one assay station. Other stations in the apparatus may be operated, synchronously or asynchronously, in a similar way.

Preparation

Before a processing run may be performed, all washes, reagents etc. must be in the relevant reservoirs. It is typically a manual task to check and fill reservoirs. Waste bottles must also have sufficient remaining capacity. The apparatus may be connected to "main-line" services such as purified water, gas and waste in some circumstances. Automatic checking of reservoir levels may be included by any of a variety of known techniques (eg, weight sensor or weight balance).

Station Configuration and Sample Storage

If fewer test substrates are to be processed than the maximum station capacity, unused cassette locations must be made inactive. Depending on the exact configuration of the fluid control devices and the station assembly, this may require no further action. In the preferred arrangement, however, it is necessary to "blank-off" unused cassette positions to prevent leakage of control gas or other fluids from exposed ports. This is achieved as shown schematically in FIG. 16.

Figure 16A:
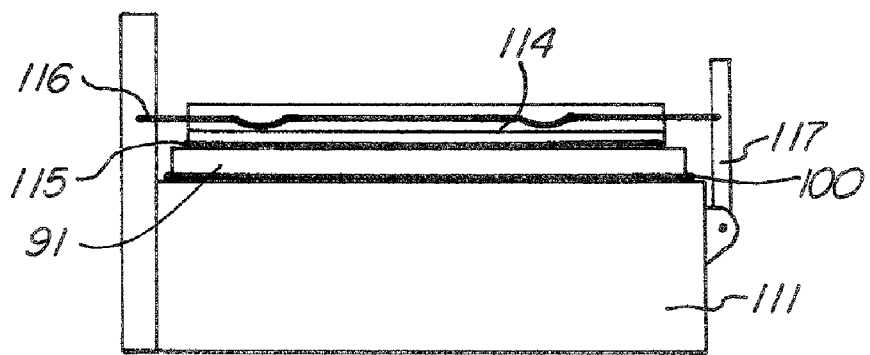
FIG. 16a is a side view and FIG. 16b a stylised plan view of a "blanked-off" cassette from the FIG. 13 assay station.
Figure 16B:
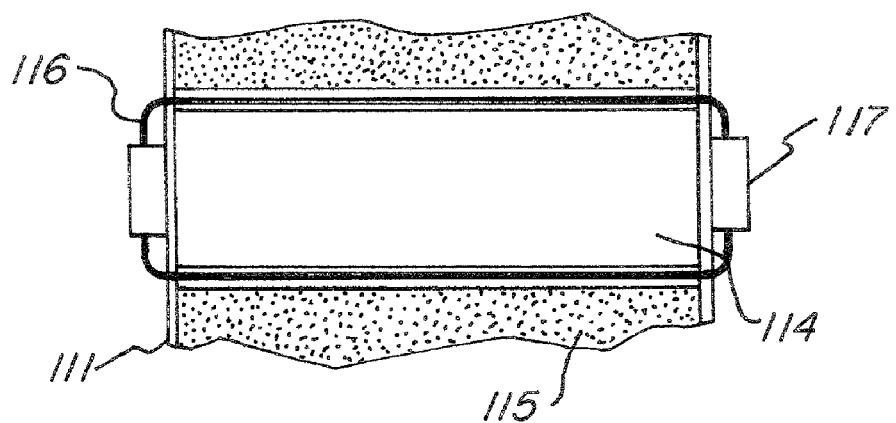

FIG. 16a is a side view and FIG. 16b a stylised plan view of a "blanked-off" cassette from the apparatus described above. As in FIG. 15, item 111 is a plate which functions both as support and also as a heat sink, item 91 is a fluidic plate carrying fluid control devices and fluid channels and item 100 is the diaphragm between these two plates. A backing plate 114 and plain sealing gasket 115 are clamped in place on top of fluidic plate 91, by means of a spring clamp 116 and toggle clamp 117.

Ideally, the apparatus is arranged so that even in the "blanked-off" cassettes, the fluid control devices are periodically (and preferably automatically) operated, ie, fluid is passed through them, to prevent or at least reduce adhesion between the flexible diaphragms and the adjacent plates.

For each "active" cassette, a diaphragm 93 and intermediate plate 94 (see FIG. 13) are used in place of the backing plate 114 and gasket 115, secured using similar spring and toggle clamps. With these in place, one or more small quantities of sample fluid or other reagent may be pre-loaded into one or more of the storage devices of the cassette, ideally via fluid loading devices, using for instance a pipette or syringe. (The syringe is ideally fitted with a hollow tip suitable for sealing into the inlet port of the relevant fluid control device.)

Fitting Test Substrates

Once the sample and other necessary fluids have been pre-loaded, the gasket 95, test substrate 97 and clamp plate 96 (FIGS. 13 and 15) may be fitted to each active cassette. Again these are conveniently held in place by spring clamps, as described in connection with FIG. 16. The test substrate carries at least one "probe" species which will react (preferably selectively) with a target species contained in or thought to be contained in the sample under test. A typical test substrate for a biochemical assay is a glass microscope slide coated with streptavidin, with one or more (preferably an array of) biotin-tagged probes, such as nucleotide sequences, antigens or antibodies, immobilised on it. The use of avidin-biotin binding to immobilise biological reagents on a substrate is entirely conventional.

Fitting the Station Sub-Assembly to the Assay Station

Once a station sub-assembly of the type shown in FIG. 13 (containing a plurality of cassettes) has been prepared with all of the required test substrates, sample fluids and sealing plates for unused positions, it is fitted into one of the assay stations 3 of the FIG. 1 apparatus. In doing so, fluid and electrical connections are made between the fluid and thermal control devices of the station and those of the sub-assembly.

Automated Processing

The apparatus may then be used to carry out an almost fully automated chemical assay, typically under the control of a pre-programmed microcomputer or other process control means. This is set up to operate the pumps, valves, thermal controller and other requisite devices in a pre-programmed sequence. A typical such sequence involves:

i) purging the system—in turn, open each valve between reservoirs and each pump. The pump is run with the manifold bypass valve 14 (FIG. 2) open.

Liquid runs to waste, clearing all fluid conduits and manifolds as it does.

ii) washing the substrates—selected reservoirs, containing for instance concentrated wash liquid and distilled water, are connected to the pump(s) by opening the corresponding valve(s). The pump(s) are run at a rate dependent on the required fluid mixing ratio and flow rate, the latter depending on the number of active cassettes in the assay station. Inlet and outlet valves for selected cassettes are opened (by appropriate operation of the associated control valve applying pressure or vacuum or vent to the valve control ports). Outflow from the cassettes goes to waste. Active cassettes may be washed independently or together by appropriate control of their inlet and outlet valves.

iii) applying reagent(s)—as in step (ii), but using reagent fluid reservoir(s) as the source(s). Reagent fluids may include buffers, surfactants, electrolytes, catalysts, reaction initiators and/or terminators, blocking agents, labelled reagents and the like.

iv) injecting sample—with the cassette inlet valves closed but their outlet valves open, apply pressure to the corresponding control ports of the sample storage devices. Liquid stored in the devices is injected into the sample chambers of the cassettes.

Concurrently with the other steps, the temperature of the cassette assemblies may be set to a predetermined value by the thermal control system. This may involve heating or cooling, as previously described.

During the assay, pressure (and optionally vacuum) is applied alternately to the agitation devices of each pair of devices in each active cassette (the inlet and outlet valves being closed). This moves the liquid in the sample chambers back and forth.

Subsequent assay steps may involve washing, heating and/or cooling, agitating and/or supplying further reagents or samples to the test substrates and sample fluids, all as described above.

When the assay is complete, gas or air may be pumped through the cassettes to remove most of the liquid in the sample chambers. The test substrates may then be removed from the cassettes and appropriately imaged to obtain the desired test results.

In the washing step(s), the apparatus of the invention allows the wash solution concentration to be altered as desired. This in turn makes possible several successive washing steps, typically with increasing degrees of stringency.

It can be seen from the above that apparatus in accordance with the present invention can possess several key advantages, namely:

i) a small volume of reaction or wash fluid can be enclosed against the test substrate;

ii) multiple test substrates can be simultaneously and economically processed;

iii) small quantities of sample fluid can be pre-loaded and efficiently stored for each substrate under test;

iv) multiple samples can be stored for each test substrate, allowing multiple probing with for instance several different antibodies;

v) operation can be at least partially, preferably fully, automated;

vi) the sample fluid can be agitated over the active surface of the test substrate;

vii) multiple wash or reagent fluids can be introduced into the sample chamber;

viii) wash and/or reagent fluids can be blended to achieve desired concentrations or mixes that can be varied continuously with time;

ix) large numbers of samples can be assayed simultaneously, with independent control of the processing conditions (for example, the temperature and fluid movement) for each;

x) the fluid control devices, such as valves and agitators, are relatively simple and compact in construction, being incorporated into the cassettes. This allows the use of large numbers of reagent and sample fluids without undue size, complexity and cost in the apparatus as a whole.

The invention claimed is:

1. An assay device for use in carrying out a fluid-phase chemical assay, the device comprising:

a sample chamber in which a sample may be retained;

a valve comprising a control fluid inlet for controlling a flow of control fluid, a reagent fluid inlet, a reagent fluid outlet proximate to said reagent fluid inlet for permitting said reagent fluid to enter said sample chamber from said reagent fluid inlet, and a displaceable diaphragm for controlling the flow of reagent fluid from said reagent fluid inlet to said fluid outlet;

said control fluid inlet is placed on one side of said displaceable diaphragm;

said reagent fluid inlet and said fluid outlet are placed on a side of said displaceable diaphragm opposite said control fluid inlet;

wherein said displaceable diaphragm, in a first position, is in contact with both said reagent fluid inlet and said fluid outlet;

wherein said displaceable diaphragm, in a second position, is moved away from both said reagent fluid inlet and said fluid outlet;

wherein said displaceable diaphragm is moved from the first position to the second position, and vice versa, depending upon the flow of control fluid from said control fluid inlet;

two agitation devices, each having a flexible diaphragm placed between an upper plate and a lower plate;

said upper plate includes a fluid inlet and said lower plate includes a fluid outlet that is in communication with said sample chamber; and wherein pressure at either said fluid inlet or said fluid outlet causes said flexible diaphragm to fluctuate and fluid to move into and out of said sample chamber;

a storage chamber for holding reagent fluid;

said reagent fluid outlet is connected to said storage chamber;

said displaceable diaphragm extends from said reagent fluid inlet to between said storage chamber and said reagent fluid outlet for permitting reagent fluid to enter and exit said storage chamber;

wherein said displaceable diaphragm moves away from said reagent fluid outlet to allow reagent fluid to enter said storage chamber and said displaceable diaphragm moves toward said reagent fluid outlet to cause reagent fluid to exit said storage chamber; and said two fluid agitation devices are located at opposite ends of said sample chamber for moving fluid back and forth through said sample chamber.

2. An assay device according to claim 1, further comprising a fluid storage device in communication with said sample chamber for storing fluid.

3. An assay device according to claim 2, wherein said fluid storage device comprises an inlet port and a storage chamber for holding fluid received at said inlet port, and wherein a valve controls movement of fluid into and out of said storage chamber, being displaceable between a first position in which fluid is held in said storage chamber, and a second position in which fluid exits said storage chamber.

4. An assay device according to claim 3, wherein said valve is displaced by an associated valve or by pressure change to said storage chamber.

5. An assay device according to claim 3, further comprising an intermediate chamber between said storage and said outlet.

6. An assay device according to claim 2, wherein said fluid storage device stores fluid prior to its introduction into or following its evacuation from said sample chamber and further comprising a valve for controlling the flow of fluid into and out of said fluid storage device.

7. An assay device according to claim 1, further comprising a fluid loading device for loading fluid into the assay device.

8. An assay device according to claim 7, wherein said fluid loading device comprises a receptacle to accommodate fluid and a valve between said receptacle and said sample chamber.

9. An assay device according to claim 7, wherein said fluid loading device includes a first outlet between said valve and said sample chamber and a second outlet through which fluid may be evacuated, said second outlet being positioned at a higher fluid level within said receptacle than said first outlet.

10. An assay device according to claim 1, further comprising at least two fluid control devices having fluid ports and chambers of which are defined within a single unit and a diaphragm common to said at least two fluid control devices.

11. An assay device according to claim 10, wherein said diaphragm common to said at least two fluid control devices is positioned between two adjacent plates, and wherein at least some of the fluid ports and chambers of the fluid control devices are provided at one face of the plates and are at least partly defined by a sealing layer positioned adjacent the one face.

12. An assay device according to claim 11, further comprising at least two stacked plates and a diaphragm positioned between said at least two stacked plates.

13. An assay device according to claim 1, further comprising a fluid distribution assembly for introducing fluid into the device from external sources and subsequently removing the fluid from the device, said fluid distribution assembly including a fluid inlet port connected to an external source of fluid, a conduit through which fluid may pass from the inlet port to said sample chamber, a fluid outlet port, and a conduit through which fluid may pass from said sample chamber to said fluid outlet port.

14. An assay device according to claim 13, further comprising two or more adjacent plates with a diaphragm and a conduit positioned between each pair of adjacent plates.

15. An assay device according to claim 1, further comprising a substrate on which a probe specie is placed, wherein the substrate and a fluid control unit define the sample chamber, in fluid communication with the fluid control device, in which a fluid sample may be retained in contact with the test substrate.

16. An assay device according to claim 15, wherein the substrate is flat.

17. An assay device according to claim 16, further comprising a microscope slide.

18. An assay device according to claim 1, further comprising multiple sample chambers.

19. An assay device according to claim 18, further comprising one or more assay stations.

20. Apparatus according to claim 1, further comprising a flow rate monitoring device which includes a primary measuring chamber through which a first fluid may flow, a fluid inlet port upstream of the primary measuring chamber, through which a volume of a second fluid may be introduced into the first fluid flow, and a primary fluid detector associated with the primary measuring chamber for detecting the presence of the second fluid in the first fluid as they pass through the primary measuring chamber.

21. Apparatus according to claim 20, wherein the flow rate monitoring device additionally comprises a secondary measuring chamber, in fluid communication with the primary measuring chamber, the secondary measuring chamber having associated with it a secondary fluid detector for detecting the presence of the second fluid in the first as they pass through the secondary measuring chamber, and wherein fluid communication between the measuring chambers is by means of a labyrinthine fluid conduit.

22. Apparatus according to claim 1, further comprising at least partially automated controls.

23. Apparatus according to claim 1, further comprising a fluid distribution system which includes
- first and second fluid inlet lines via which first and second fluids may be drawn;
- first and second fluid flow control devices, each allowing a variable fluid flow rate in the first and second fluid inlet lines, respectively;
- a controller for controlling the flow rates through the first and second fluid flow control devices; and
- a fluid mixing device downstream of the fluid flow control devices for combining the first and second fluids emerging from the flow control devices.

24. Apparatus according to claim 23, wherein the fluid flow control devices allow the flow rates of the first and second fluids to be variable between their minimum and maximum values, allowing for variation of the first to second fluid ratio in a mixture emerging from the fluid distribution system.

* * * * *